US010540565B2

(12) United States Patent
Niikura

(10) Patent No.: US 10,540,565 B2
(45) Date of Patent: Jan. 21, 2020

(54) SECURITY CAMERA SYSTEM AND IMAGE PROCESSING APPARATUS

(71) Applicant: Renesas Electronics Corporation, Tokyo (JP)

(72) Inventor: Kentarou Niikura, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 15/954,670

(22) Filed: Apr. 17, 2018

(65) Prior Publication Data

US 2018/0341827 A1    Nov. 29, 2018

(30) Foreign Application Priority Data

May 24, 2017    (JP) ................................ 2017-103097

(51) Int. Cl.
*G06K 9/34*    (2006.01)
*H04N 5/232*    (2006.01)
*G06K 9/46*    (2006.01)

(52) U.S. Cl.
CPC ............ *G06K 9/346* (2013.01); *G06K 9/46* (2013.01); *H04N 5/23229* (2013.01)

(58) Field of Classification Search
CPC ...... G06K 9/346; G06K 9/46; G06K 9/00771; G06K 9/3233; H04N 5/247; H04N 5/232; H04N 5/23229; G08B 13/00
USPC ........................................................ 348/143
See application file for complete search history.

(56) References Cited

U.S. PATENT DOCUMENTS

| 8,704,908 B1* | 4/2014 | Aldrich | H04N 5/23212 348/222.1 |
| 2004/0016870 A1* | 1/2004 | Pawlicki | B60W 30/18 250/208.1 |
| 2008/0285797 A1* | 11/2008 | Hammadou | G06K 9/00771 382/103 |

(Continued)

FOREIGN PATENT DOCUMENTS

| JP | 2000-278349 A | 10/2000 |
| JP | 2001-333267 A | 11/2001 |

OTHER PUBLICATIONS

Mahbod et al., Ultralow power, high fill factor smart complementary metal oxide semiconductor image sensor with motion detection, Nov. 23, 2016, SPIE, Journal of Electronic Imaging 25(6), pp. 2-3, (Year: 2016).*

(Continued)

*Primary Examiner* — Marnie A Matt
(74) *Attorney, Agent, or Firm* — Mattingly & Malur, PC

(57) ABSTRACT

A security camera system capable of reducing an amount of information without degrading useful information is provided. The security camera system includes a pixel array, an image signal processor that performs various types of image processing on raw data including each pixel value from the pixel array, and a pre-stage processing unit arranged between the pixel array and the image signal processor. The pre-stage processing unit includes an important area extraction circuit that receives raw data from the pixel array with respect to each frame and divides an effective pixel area of the frame into an important area and an unimportant area, and transmits the raw data of the important area to the image signal processor.

19 Claims, 18 Drawing Sheets

(56) References Cited

U.S. PATENT DOCUMENTS

| | | | | |
|---|---|---|---|---|
| 2011/0298933 A1* | 12/2011 | Yanowitz | ............... | H04N 5/367 |
| | | | | 348/175 |
| 2012/0044372 A1* | 2/2012 | Cote | ................. | H04N 5/23245 |
| | | | | 348/218.1 |
| 2012/0314950 A1* | 12/2012 | Smith | .................... | G06K 9/346 |
| | | | | 382/173 |
| 2016/0300117 A1* | 10/2016 | Yamamoto | ........... | G06K 9/3241 |
| 2017/0134648 A1* | 5/2017 | Awatani | ................. | H04N 5/217 |
| 2017/0272637 A1* | 9/2017 | Kawazoe | ............... | H04N 5/232 |
| 2019/0102870 A1* | 4/2019 | Tokizaki | ................... | G06T 5/50 |

OTHER PUBLICATIONS

Yamashita, et al., A CMOS Imager With a Programmable Bit-Serial Column-Parallel SIMD/MIMD Processor (Year: 2009).*

* cited by examiner

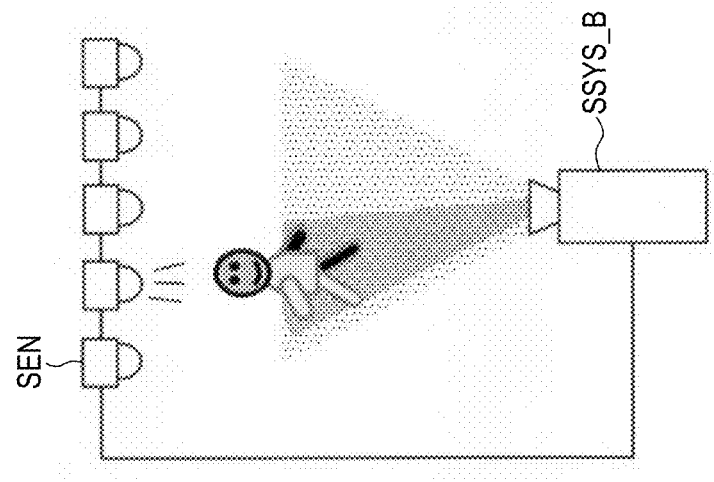
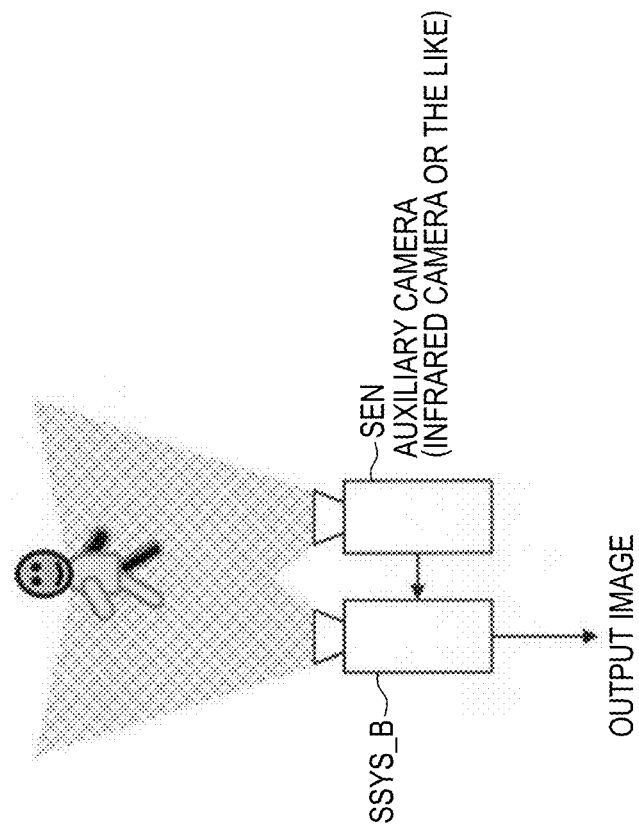

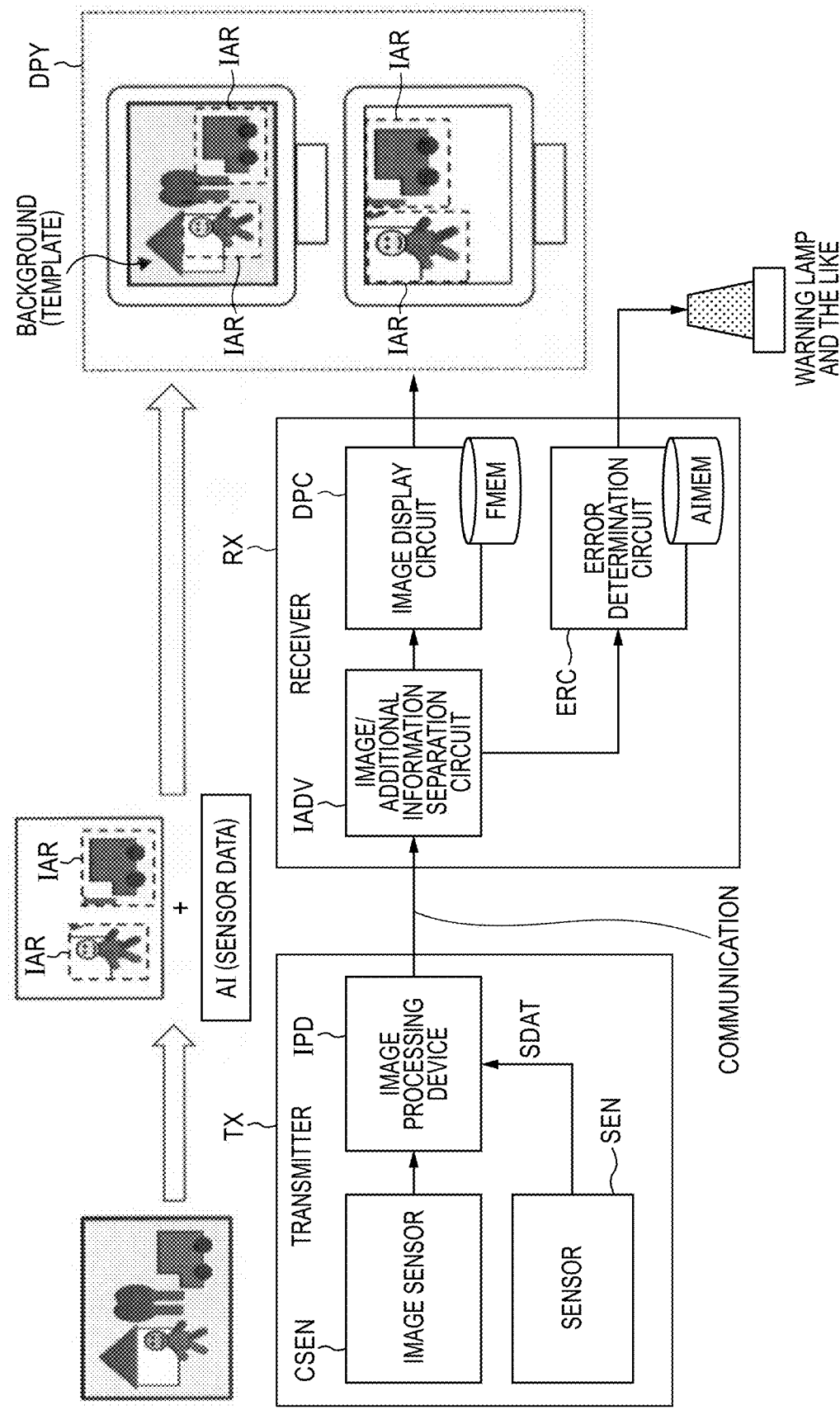

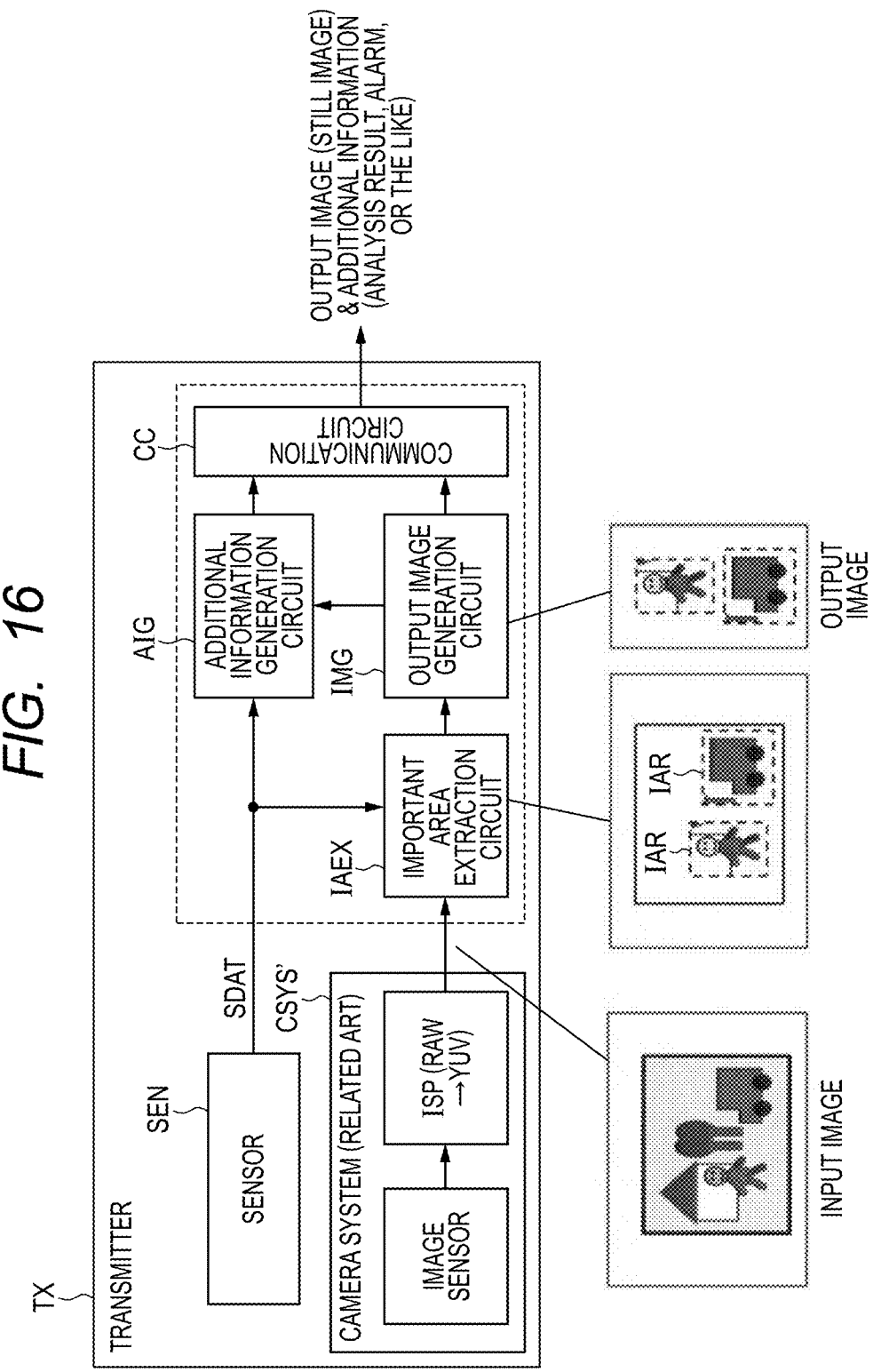

SECURITY CAMERA SYSTEM AND IMAGE PROCESSING APPARATUS

CROSS-REFERENCE TO RELATED APPLICATIONS

The disclosure of Japanese Patent Application No. 2017-103097 filed on May 24, 2017 including the specification, drawings and abstract is incorporated herein by reference in its entirety.

BACKGROUND

The present invention relates to a security camera system and an image processing apparatus such as the security camera system and the image processing apparatus for sensing applications.

Japanese Unexamined Patent Application Publication No. 2000-278349 discloses a compressed data transmission device that transmits to a communication path image data generated while appropriately changing its compression ratio. Japanese Unexamined Patent Application Publication No. 2001-333267 discloses a method of embedding a digital watermark, the method making it difficult for a third party to locate the watermark information while suppressing image degradation.

SUMMARY

For example, resolution improvement and image quality improvement have been promoted in the field of image processing such as a camera (image sensor) application. Accordingly, the size of the data to be handled has become extremely larger, which requires a large amount of resources for processing, transmission, and storage. For this reason, a technology is required that can reduce the amount of resources of camera systems, infrastructures (such as communication network, storage, memory, CPU (Central Processing Unit)), and the like. On the other hand, in the field of image processing, demand is increasing not for a viewing application that requires the whole image but for sensing such as monitoring, detection, and recognition intended for, for example, an IoT (Internet of Things) application. A camera for the sensing application does not necessarily require the whole image but has only to obtain only useful information in the image according to the application (purpose).

Under such circumstances, the existing image processing includes such a process as uniformly compressing the whole image data as described in Japanese Unexamined Patent Application Publication No. 2000-278349 or uniformly processing (degrading) the whole image data as described in Japanese Unexamined Patent Application Publication No. 2001-333267. While such a technology has a high versatility, it may lower the efficiency in some applications because the whole image data is uniformly processed. Specifically, it may be difficult to prevent the useful information from degrading and to reduce an amount of the information at the same time.

Embodiments described below are made taking into account the above issues, and other problems and novel features will become apparent from description of this specification and accompanying drawings.

A security camera system according to one embodiment includes a pixel array, an image signal processor that performs various types of image processing on raw data including each pixel value from the pixel array, and an image processing unit arranged between the pixel array and the image signal processor. The image processing unit includes an important area extraction circuit that receives the raw data from the pixel array with respect to each frame and divides an effective pixel area of the frame into an important area and an unimportant area, and transmits the raw data of the important area to the image signal processor.

The one embodiment allows for reducing the amount of information without degrading useful information in the security camera system.

BRIEF DESCRIPTION OF THE DRAWINGS

FIG. 11A is a diagrammatic view showing an example applied to an actual application in a security camera system according to a second embodiment of the invention;

FIG. 11B is a diagrammatic view showing another example applied to an actual application in the security camera system according to the second embodiment of the invention;

FIG. 15 is a diagrammatic view showing an exemplary configuration and an exemplary operation of a main part of a security camera system according to a fourth embodiment of the invention;

FIG. 16 is a diagrammatic view showing an exemplary configuration and an exemplary operation of a main part different from what is shown in FIG. 15;

DETAILED DESCRIPTION

Although the present invention will be described below in separate sections or embodiments as needed, they are not irrelevant to one another, but one may be a variation, detail, or supplementary explanation of a part or all of the other unless otherwise expressly stated. Moreover, when referring to a number or the like of elements (including the number of pieces, a numerical value, an amount, and a range) in the following embodiments, it is not limited to the specific number but may be more than or less than the specific number unless otherwise expressly stated or unless apparently limited to the specific number in principle.

Furthermore, it is needless to say that components (including element steps) in the following embodiments may not necessarily be essential unless otherwise expressly stated or unless apparently essential in principle. Similarly, in the following embodiments, when referring to a shape, a positional relation or the like of the components, what is approximate to or similar to the shape is substantially included unless otherwise expressly stated or unless apparently not applicable in principle. This similarly applies to the numeral values and ranges described above.

Moreover, circuit elements that include respective functional blocks of the embodiments may be formed over a semiconductor substrate such as a monocrystalline silicon substrate using a known integrated-circuit technology such as CMOS (complementary MOS semiconductor), though not limited thereto.

Hereinbelow, embodiments of the present invention will be described with reference to drawings. It should be noted that like components are denoted by like numerals throughout the drawings and the explanation thereof may not be repeated as a general rule.

First Embodiment

[Outline and Problem of Security Camera System (Comparison Example)]

Figure 17A:
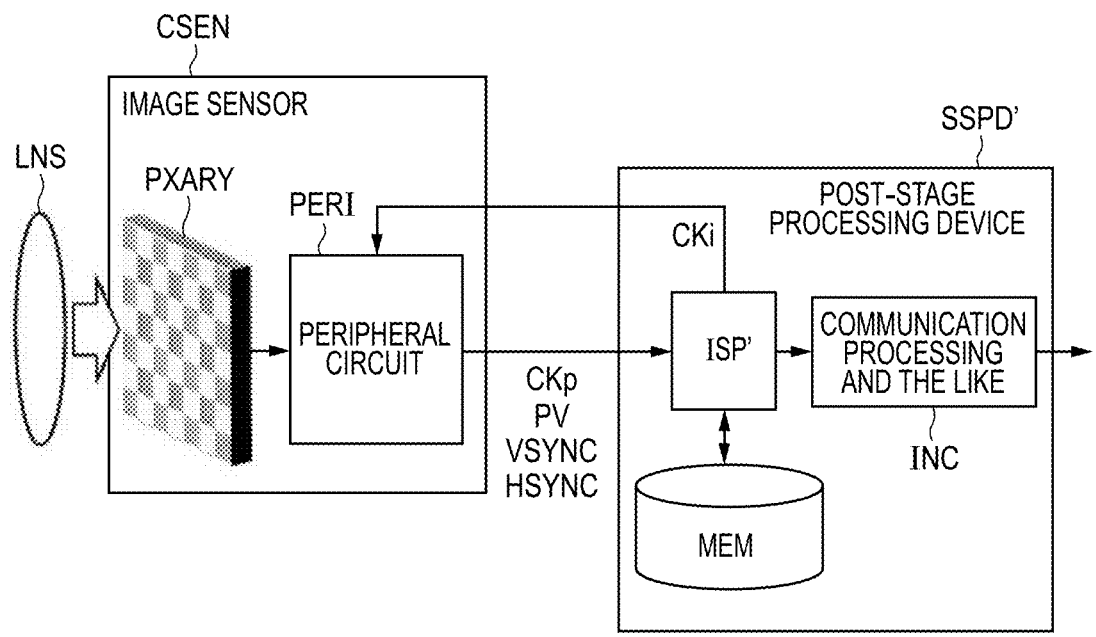
FIG. 17A is a diagrammatic view showing an exemplary configuration of a main part of a security camera system according to a comparison example of the invention.
Figure 17B:
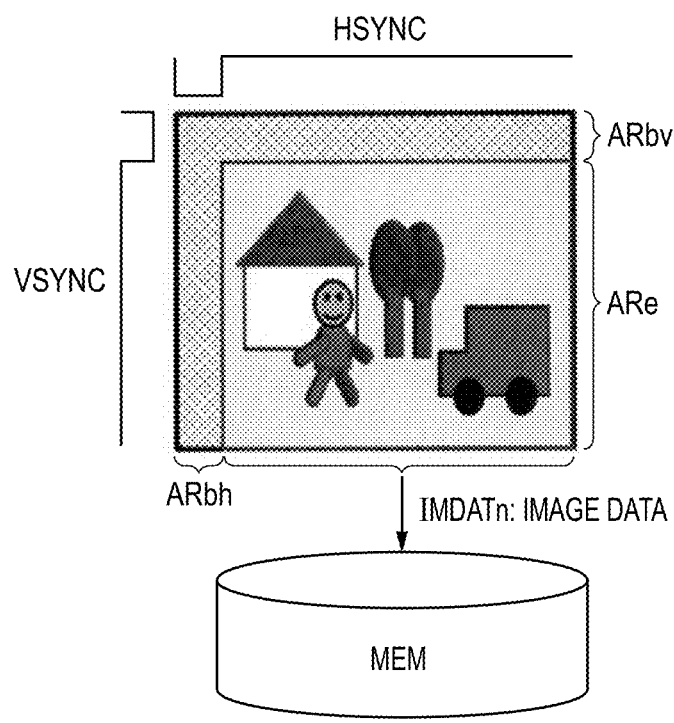
FIG. 17B is a schematic view showing an example of data obtained by the system shown in FIG. 17A.
Figure 18:
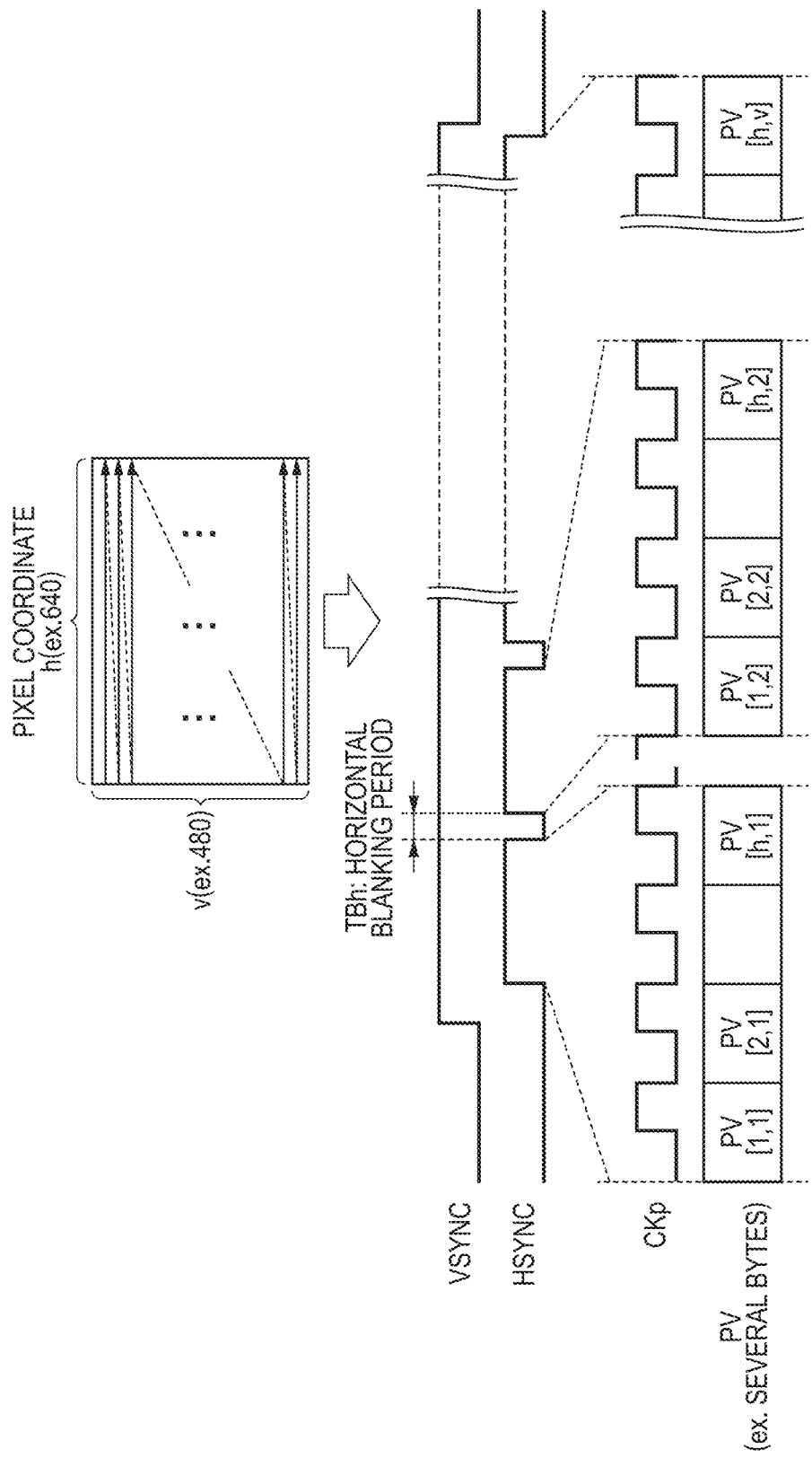
FIG. 18 is a timing chart showing an example of output signals from an image sensor to an image signal processor shown in FIG. 17A.

Prior to description of a security camera system according to an embodiment of the present invention, the security camera system according to a comparison example is described first. FIG. 17A is a diagrammatic view showing an exemplary configuration of a main part of the security camera system according to the comparison example, and FIG. 17B is a schematic view showing an example of data obtained by the system shown in FIG. 17A. FIG. 18 is a timing chart showing an example of output signals from an image sensor to an image signal processor shown in FIG. 17A.

The security camera system shown in FIG. 17A includes a lens LNS, an image sensor CSEN, and a post-stage processing device SSPD'. The image sensor CSEN includes a pixel array PXARY included by a plurality of imaging elements arranged in an array form (in other words, pixels) and a peripheral circuit PERI that controls the pixel array PXARY. The plurality of imaging elements are, for example, devices of a CCD type or a CMOS type, and typically arranged to repeat four imaging elements corresponding to 2×G (green)+R (red)+B (blue). The peripheral circuit PERI includes as generally known, a circuit for reading out an electric charge signal of each imaging element, a circuit for amplifying the electric charge signal, an analog-to-digital converter for converting the amplified analog signal into a digital signal, and the like.

The post-stage processing device SSPD' includes an image signal processor ISP', a memory MEM, and various internal circuits INC for performing communication processing and the like. As generally known, the image signal processor ISP' is responsible for controlling the image sensor CSEN and performs various image processing such as correction on raw data (raw data including a monochromatic pixel value of each pixel) from the pixel array PXARY using the memory MEM to generate image data in the RGB format or the YUV format. In addition, the image signal processor ISP' may convert the image data into another image format such as JPEG.

Specifically, the image signal processor ISP' supplies a clock signal CKi after performing various settings on the peripheral circuit PERI of the image sensor CSEN in regard to the way of obtaining the raw data. Accordingly, as shown in FIG. 18, the image sensor CSEN outputs a pixel clock signal CKp, a pixel value PV of each pixel, a vertical synchronizing signal VSYNC, and a horizontal synchronizing signal HSYNC.

The vertical synchronizing signal VSYNC indicates a transmission period of the pixel values PV for a single frame, which is controlled to be a level '1' (or level 'H', for example) for the corresponding period in this example. The horizontal synchronizing signal HSYNC indicates the transmission period or the pixel values PV for a single line in a single frame, which is controlled to be the level '1' (or level 'H', for example) for the corresponding period in this example. As a specific example, a case is assumed in which a pixel coordinate is "h (such as 640)×v (such as 480)".

In this case, after the vertical synchronizing signal VSYNC is controlled to the level '1', "h" pixel values PV[1,1] to PV[h,1] included in the first row (v=1) are output in synchronization with the pixel clock signal CKp during the first period in which the horizontal synchronizing signal HSYNC is controlled to the level '1'. During the second period in which the horizontal synchronizing signal HSYNC is controlled to the level '1', "h" pixel values PV[1,2] to PV[h,2] included in the second row (v=2) are output. Thereafter, the pixel values are output in the same manner until the pixel value PV[h,v] is output.

The pixel value PV of each pixel may be parallel data of typically one byte to several bytes depending on the structure of the pixel array PXARY. The pixel value PV of each pixel as read out from the pixel array PXARY via the peripheral circuit PERI is referred to as the raw data. As shown in FIG. 18, when the row is switched, there is provided the horizontal blanking period TBh in which the horizontal synchronizing signal HSYNC is controlled to the level '0' (or level 'L', for example). Similarly, when the frame is switched, there is provided the vertical blanking period in which the vertical synchronizing signal VSYNC is switched to the level '0' (or level 'H', for example). Although the level '1' is assumed to be an active level and the level '0' is assumed to be a non-active level in regard to the vertical synchronizing signal VSYNC, it is also possible to assume the level '1' as the active level and the level '0' as the non-active level. The same applies to the horizontal synchronizing signal HSYNC.

As shown in FIG. 17B, the image signal processor ISP' generates the image data IMDATn in the RGB format or the YUV format by performing various types of image processing on such raw data, and stores it in the memory MEM. As shown in FIG. 17B the pixel array PXARY generally includes, in addition to an effective pixel area ARe on which the image data IMDATn is based, a vertical blanking area (ineffective pixel area) ARbv and a horizontal blanking area (ineffective pixel area) ARbh arranged around the effective pixel area ARe. The vertical blanking area ARbv and the horizontal blanking area ARbh correspond to the vertical blanking period and the horizontal blanking period TBh described with reference to FIG. 18, respectively.

In this manner, in the security camera system according to the comparison example, the image signal processor ISP' generates the image data IMDATn from the whole area of the effective pixel area ARe in the pixel array PXARY. This may increase resources such as processing load of the image signal processor ISP', required capacity of the memory MEM, and a bandwidth required for a communication network. Thus, due to the constraint on the resources, the resolution improvement of the pixel array PXARY (quality improvement of image data) can be difficult.

On the other hand, when using the security camera system for sensing applications (for example, prevention and event detection) such as monitoring, detection, and recognition intended for, for example, IoT, the image data IMDATn of the whole area of the effective pixel area ARe is not necessarily required but only useful information included in a part of the image data may be required depending on the application (purpose). As a method of image processing, it is known to uniformly process the whole image data, as disclosed in Japanese Unexamined Patent Application Publication No. 2000-278349 and Japanese Unexamined Patent Application Publication No. 2001-333267. When processing the whole image data uniformly, if the amount of information is reduced, a degree of degradation can be adjusted but the useful information included in the image data IMDATn should also essentially degrade in proportion to the reduced amount.

Moreover, such a method as disclosed in Japanese Unexamined Patent Application Publication No. 2000-278349 and Japanese Unexamined Patent Application Publication No. 2001-333267 is to be applied to the image data IMDATn generated by the image signal processor ISP', and therefore it is difficult to reduce the resources of the image signal processor ISP' and the like described above. As a result, even if degradation of the useful information can be suppressed to some degree, it is still difficult to further increase the value of the useful information by resolution improvement and the like unless the resources of the image signal processor ISP' are increased. For this reason, it is useful to employ the method of the embodiments described below.

[Outline of Security Camera System (First Embodiment)]

Figure 1:
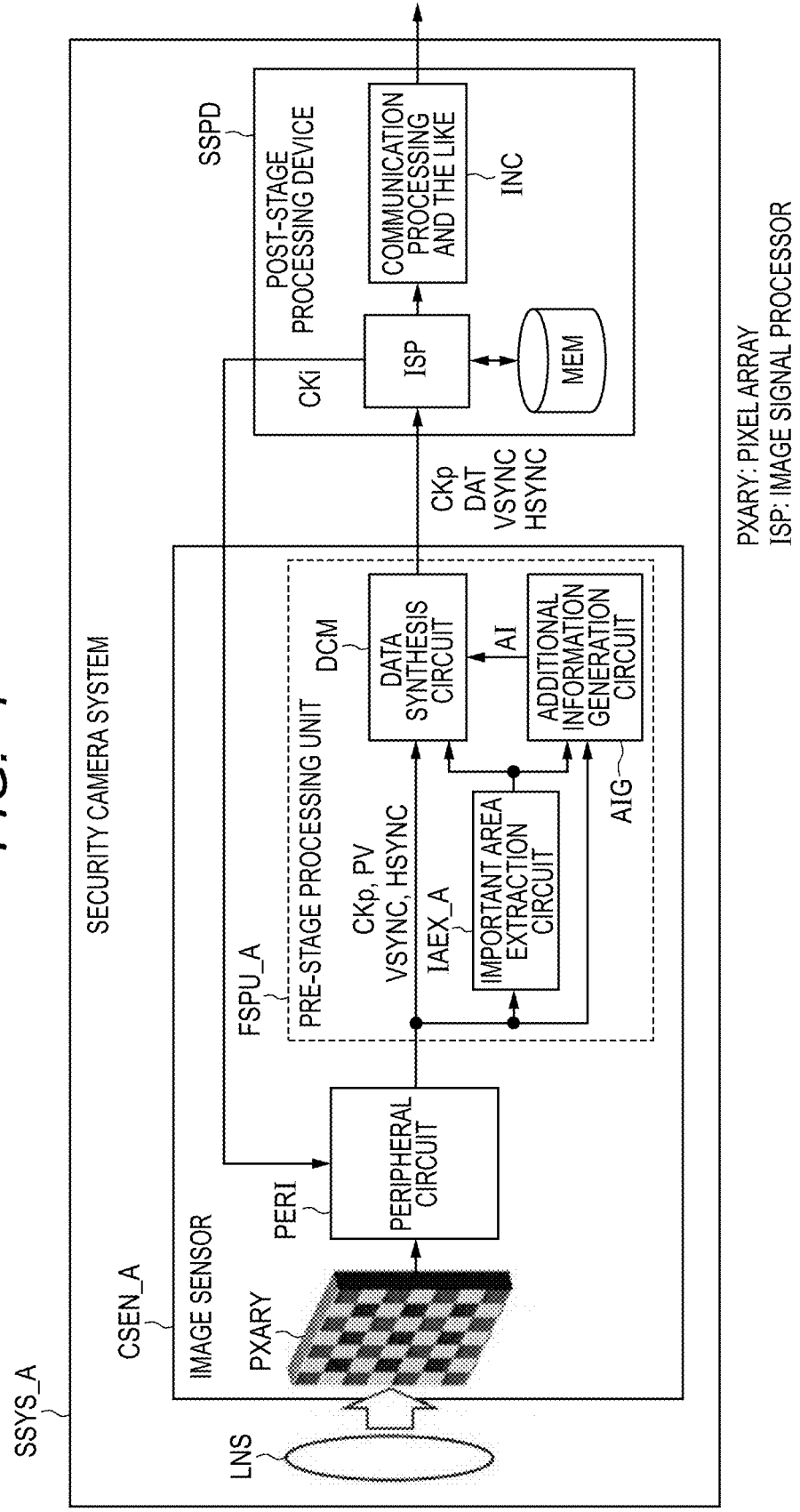
FIG. 1 is a diagrammatic view showing an exemplary configuration of a main part of a security camera system according to a first embodiment of the present invention.
Figure 2:
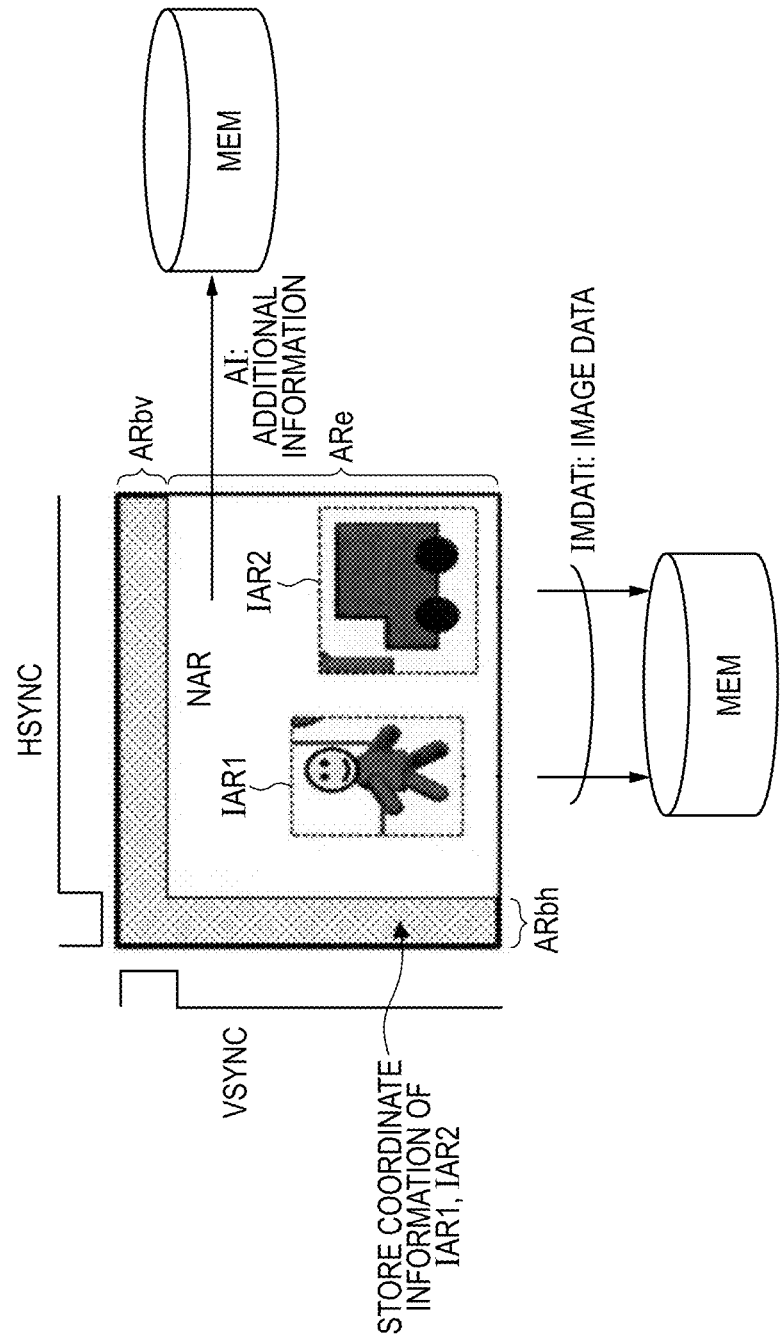
FIG. 2 is a schematic view showing an example of data obtained by the system shown in FIG. 1.

FIG. 1 is a diagrammatic view showing an exemplary configuration of a main part of a security camera system according to a first embodiment of the present invention. FIG. 2 is a schematic view showing an example of data obtained by the system shown in FIG. 1. The security camera system SSYS_A includes a lens LNS, an image sensor CSEN_A, and a post-stage processing device SSPD. The post-stage processing device SSPD includes an image signal processor ISP, the memory MEM, and the various internal circuits INC, as in the example shown in FIG. 17A. It should be noted that, though details will be described later, the image signal processor ISP performs processing partially different from what is performed by the image signal processor ISP' shown in FIG. 17A.

The image sensor CSEN_A is included by, for example, a single semiconductor chip, and includes a pre-stage processing unit FSPU_A in addition to the pixel array PXARY and the peripheral circuit PERI as in FIG. 17A. The pre-stage processing unit (image processing unit) FSPU_A includes an important area extraction circuit IAEX_A, an additional information generation circuit AIG, and a data synthesis circuit DCM. The important area extraction circuit IAEX_A receives raw data from the pixel array PXARY (precisely, peripheral circuit PERI) with respect to each frame, and divides the effective pixel area of the frame into an important area and an unimportant area.

The additional information generation circuit AIG generates predetermined additional information AI. The additional information AI is some kind of information according to a user application or the like such as, for example, an image analysis result of the raw data of the important area. The data synthesis circuit DCM combines the additional information AI and the raw data from the pixel array PXARY, and transmits the resulting data to the image signal processor ISP of the post-stage processing device SSP.

Specifically, as shown in FIG. 2, the important area extraction circuit IAEX_A divides the effective pixel area ARe of the frame into important areas IAR1, IAR2, and an unimportant area NAR, based on the change of each pixel value PV and the like. In this specification, the important areas IAR1, IAR2 are collectively referred to as an important area IAR. The data synthesis circuit DCM transmits the raw data of the important area IAR to the image signal processor ISP during a period corresponding to the important area IAR in the transmission period of the frame as shown in FIG. 18, based on the distinction information from the important area extraction circuit IAEX_A. On the other hand, the data synthesis circuit DCM transmits the additional information AI to the image signal processor ISP instead of the raw data of the unimportant area NAR during a period corresponding to the unimportant area NA in the transmission period of the frame.

Assuming to use its general function, the image signal processor ISP needs to receive the raw data, according to a specified format as shown in FIG. 18, on the presumption that the data length for one frame is fixed. Thus, as shown in FIG. 2, while retaining the specified format (data length for one frame), the pre-stage processing unit (image processing unit) FSPU_A transmits the important area IAR in a normal period and transmits the additional information AI in a remaining period corresponding to the unimportant area NAR.

On the other hand, the image signal processor ISP needs to distinguish the important area IAR from the additional information AI in the data DAT received with the raw data of the important area IAR and the additional information AI mixed therein. So, the important area extraction circuit IAEX_A (specifically, a blanking period information generation circuit in it (to be described later)) generates coordinate information of the important area IAR based on the distinction information of itself. The data synthesis circuit DCM then transmits the coordinate information of the important area IAR to the image signal processor ISP with the blanking period (horizontal blanking period TBh shown in FIG. 8) corresponding to the blanking area (for example, the horizontal blanking area ARbh), as shown in FIG. 2.

The image signal processor ISP obtains the raw data of the important area IA and the additional information AI separately by recognizing the coordinate information. Then, as shown in FIG. 2, the image signal processor ISP performs various types of image processing on the raw data of the important areas IAR1, IAR2, and stores the generated image data IMDATi in the memory MEM. Moreover, the image signal processor ISP stores the obtained additional information AI in the memory MEM, as shown in FIG. 2.

It should be noted that the coordinate information of the important area IAR has only to be stored in the horizontal or vertical blanking period (ARbh, ARbv), and preferably in the blanking period before the important area IAR emerges. That is, the image signal processor ISP may sometimes store the raw data included in the ineffective pixel area (i.e. the blanking period) in addition to the effective pixel area ARe, for example, in the memory MEM temporarily, and then read out the raw data from the memory MEM to perform the image processing. In such a case, the coordinate information has only to be stored during any given period in the blanking period.

Thus, the image signal processor ISP can distinguish between the raw data of the important area IAR and the additional information AI and obtain them from the memory MEM by reading out the coordinate information from the memory MEM first. Because the image signal processor ISP has only to perform the image processing on the obtained raw data of the important area IAR, it is possible to reduce the load of the image processing. In this case, however, because the raw data of the whole image is once stored in the memory MEM, a large capacity is required for the memory MEM.

On the other hand, in a case where the coordinate information is stored in the blanking period before the important area IAR emerges, the image signal processor ISP can obtain the coordinate information in the process of receiving the raw data as shown in FIG. 18 and extract the raw data of the important area IAR in real time in parallel with the receiving process based on the received coordinate information. In such a case, the image signal processor ISP can store the raw data of only the important area IAR in the memory MEM. This can further reduce the resources.

Figure 3:
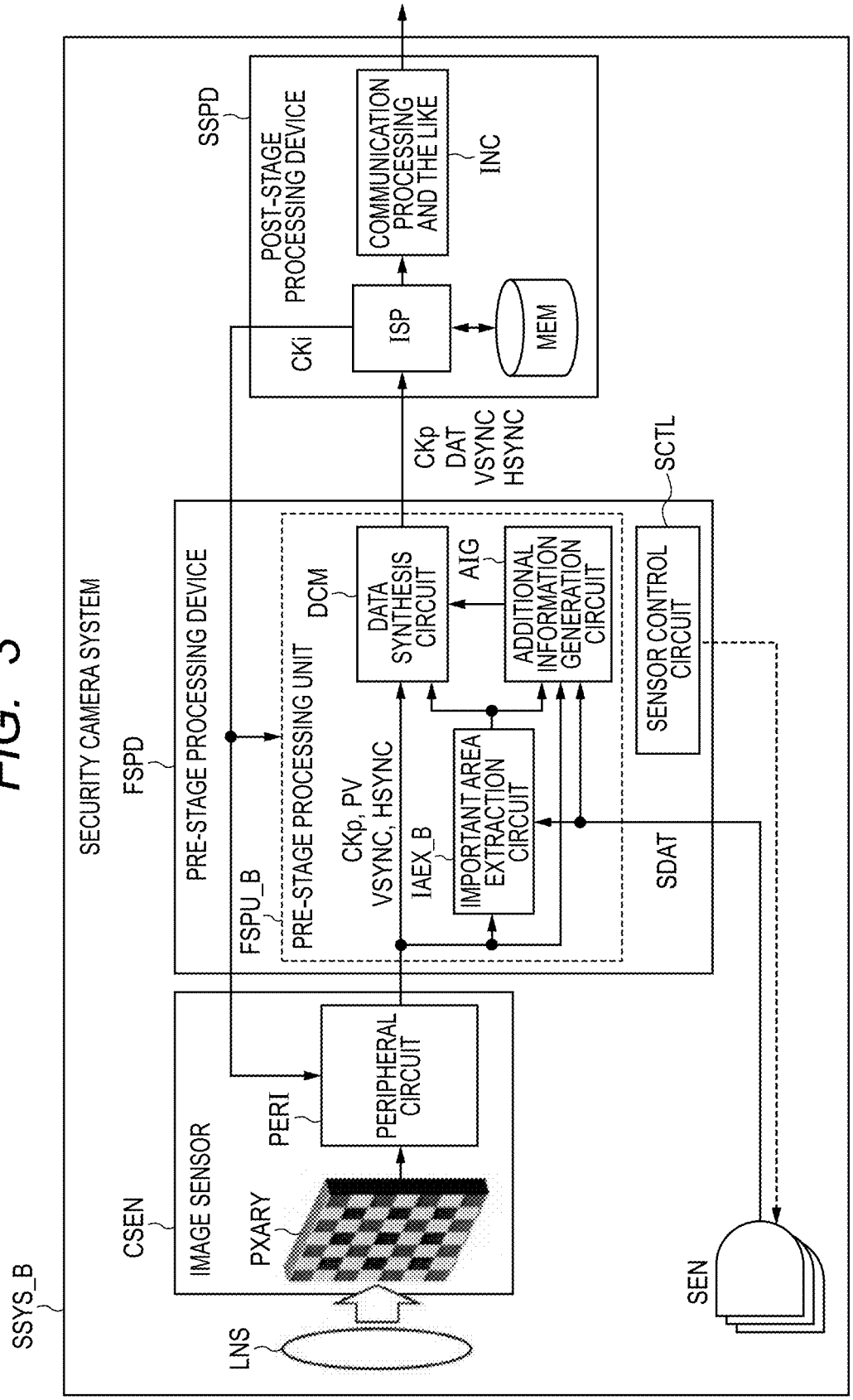
FIG. 3 is a diagrammatic view showing another exemplary configuration of the main part different from what is shown in FIG. 1 in the security camera system according to the first embodiment of the invention.

FIG. 3 is a diagrammatic view showing another exemplary configuration of the main part different from what is shown in FIG. 1 in the security camera system according to the first embodiment of the invention. The security camera system SSYS_B includes the image sensor CSEN, a pre-stage processing device FSPD, the post-stage processing device SSPD, and a sensor SEN. The image sensor CSEN is the same as that shown in FIG. 17A, which may be included by a single semiconductor device, for example. The post-stage processing device SSPD is the same as that shown in FIG. 1. The pre-stage processing device FSPD is provided between the image sensor CSEN and the post-stage processing device SSPD, and included by a single semiconductor device, for example.

The sensor SEN may be any type of sensors such as a temperature sensor and a voice sensor. The pre-stage processing device FSPD includes a pre-stage processing unit (image processing unit) FSPU_B and a sensor control circuit SCTL. The sensor control circuit SCTL controls the sensor SEN. The sensor SEN receives control from the sensor control circuit SCTL to output sensor data SDAT in parallel with the raw data with respect to each frame from the pixel array PXARY. The pre-stage processing unit FSPU_B is substantially the same as the pre-stage processing unit FSPU_A shown in FIG. 1.

It should be noted that, unlike FIG. 1, an important area extraction circuit IAEX_B distinguishes between the important area IAR and the unimportant area NAR based on the sensor data SDAT. Moreover, the additional information generation circuit AI may generate information based on the sensor data SDAT as the additional information AI, in addition to the information based on the image analysis as in the case shown in FIG. 1. Specifically, the additional information AI may be the sensor data SDAT itself, or the analysis result of the sensor data SDAT, for example.

Figure 4A:
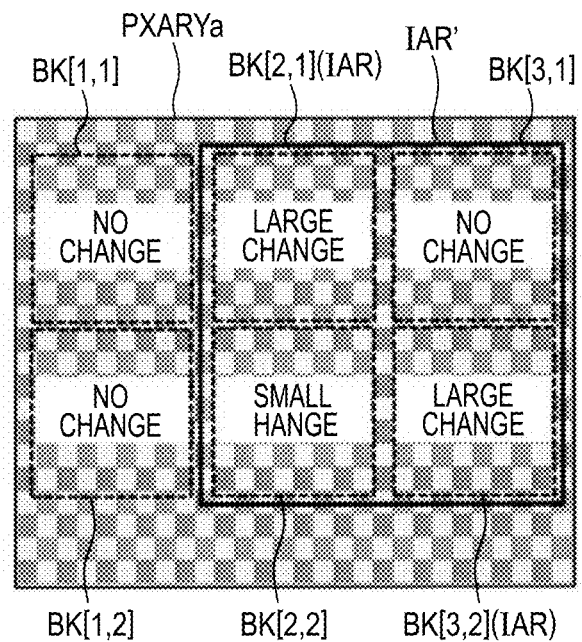
FIG. 4A is a conceptual view showing an example of a method of determining an important area in the security camera system shown in FIGS. 1 and 3.
Figure 4B:
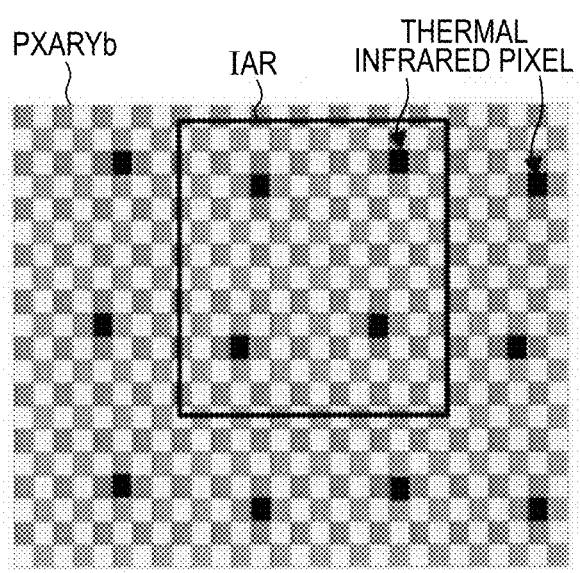
FIG. 4B is a conceptual view showing an example of the method of determining an important area in the security camera system shown in FIG. 1 or 3.

FIGS. 4A and 4B are conceptual views showing examples of a method of determining the important area in the security camera system shown in FIGS. 1 and 3. In the example shown in FIG. 4A, the important area extraction circuit IAEX_A of FIG. 1 distinguishes between the important area IAR and the unimportant area NAR based on a comparison between each pixel value PV of the raw data in a former frame and each pixel value of the raw data in a current frame. Performing comparison with respect to each pixel value PV at this time may increase the size and the processing load of a circuit that performs the comparison, and possibly make it difficult to delimit the area.

Accordingly, as shown in FIG. 4A, the important area extraction circuit IAEX_A manages the pixel array PXARYa (i.e. effective pixel area of the frame) by dividing it into a plurality of blocks BK[1,1] to BK[3,1], . . . , BK[1,2] to BK[3,2], . . . . The important area extraction circuit IAEX_A determines whether the block is the important area IAR or the unimportant area NAR by comparing either an integrated value or an average value of each pixel values included in each of the blocks between the last time and this time.

In the example shown in FIG. 4A, the change of the integrated value (or the average value) of the pixel values between the last time and this time is larger in the blocks BK[2,1] and BK[3,2]. In this case, the important area extraction circuit IAEX_A may determine that the blocks BK[2,1] and BK[3,2] are the important areas IAR that include some moving body, for example. Moreover, in this example, a small change is observed in the block BK[2,2] adjacent to the blocks BK[2,1] and BK[3,2]. In such a case, the important area extraction circuit IAEX_A may determine a larger rectangular area including the block BK[3,1] as an important area IAR'.

In the example shown in FIG. 4B, the important area extraction circuit IAEX_A of FIG. 1 distinguishes between the important area IAR and the unimportant area NAR based on information from the temperature sensor embedded in a pixel array PXARYb. The pixel array PXARYb may include, as shown in FIG. 4B, pixels that sense a thermal infrared ray arranged at predetermined intervals. When using such a pixel array PXARYb, the important area extraction circuit IAEX_A of FIG. 1 may recognize an area having a higher temperature (for example, an area in which a human is present) based on the information of the thermal infrared pixel and determine this area as the important area IAR.

Although the example is taken herein in which the temperature sensor is embedded in the pixel array PXARYb, the important area extraction circuit IAEX_B of FIG. 3 may perform the same processing even when the temperature sensor (SEN) is provided outside the pixel array PXARYb as shown in FIG. 3. Determination of the important area can be performed in various methods according to the application, including such a typical method as described above. For example, when the sensor SEN is a position sensor (displacement sensor), an area of the pixel array PXARY in which the displacement is observed may be determined as the important area IAR.

[Details of Important Area Extraction Circuit]

Figure 5:
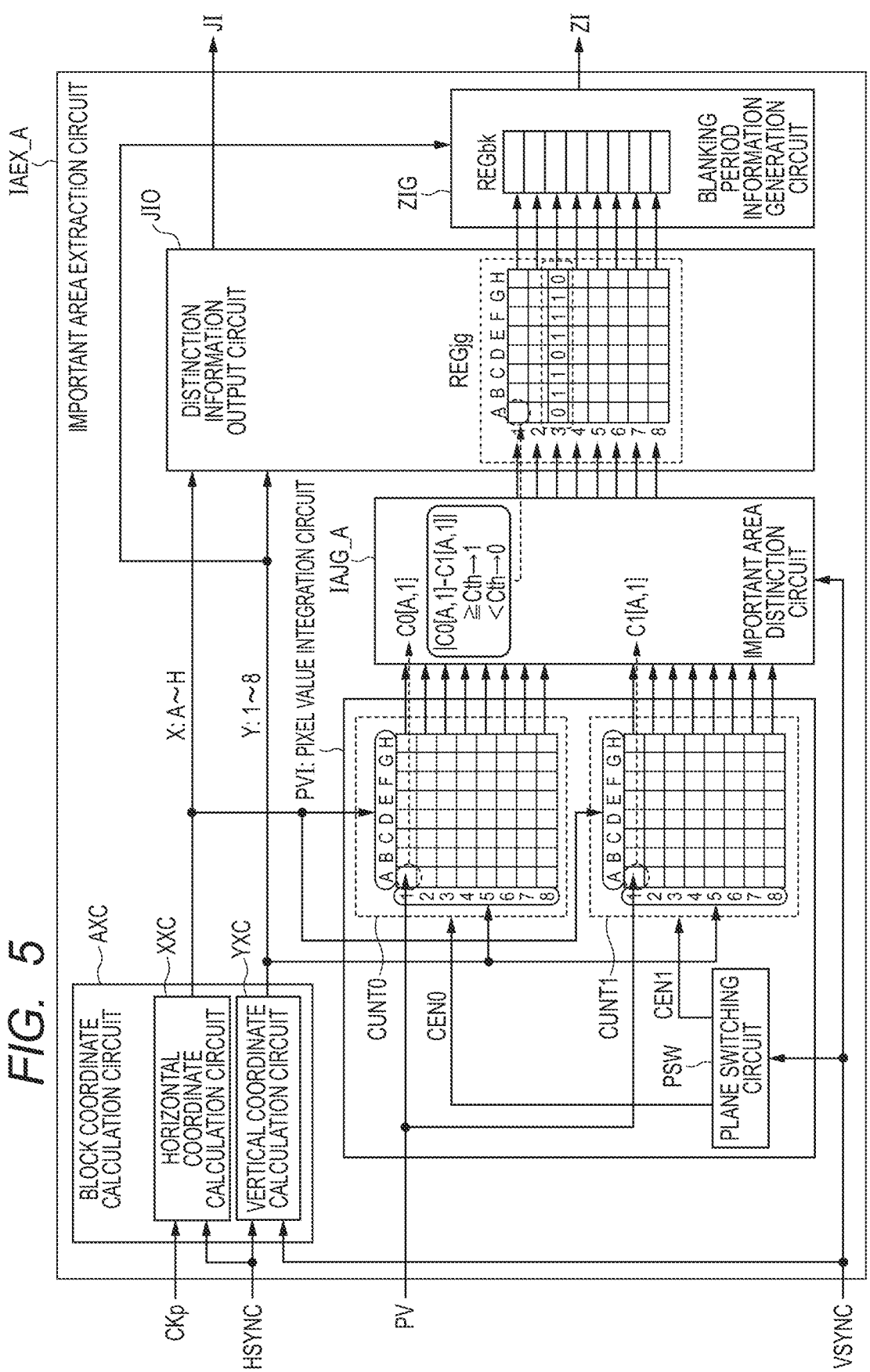
FIG. 5 is a block diagram showing an exemplary configuration of an important area extraction circuit in FIG. 1.
Figure 6:
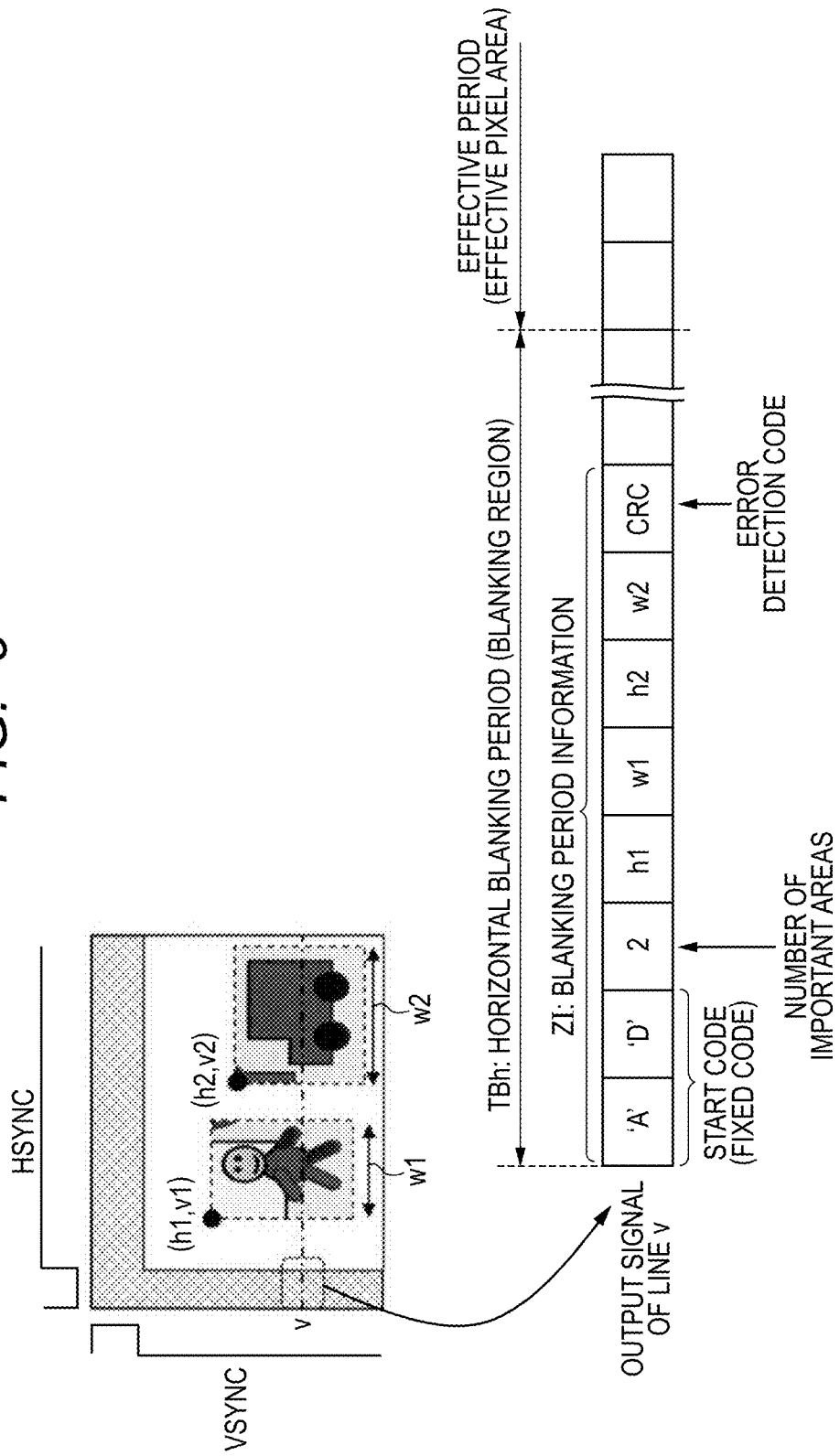
FIG. 6 shows an exemplary operation of a blanking period information generation circuit in FIG. 5.

FIG. 5 is a block diagram showing an exemplary configuration of an important area extraction circuit in FIG. 1. FIG. 6 shows an exemplary operation of a blanking period information generation circuit in FIG. 5. The important area extraction circuit IAEX_A shown in FIG. 5 includes a block coordinate calculation circuit AXC, a pixel value integration circuit PVI, important area distinction circuit IAJG_A, a distinction information output circuit JIO, and a blanking period information generation circuit ZIG. The important area extraction circuit IAEX_A extracts the important area IAR based on the change of the pixel value PV as described with reference to FIG. 4A.

The block coordinate calculation circuit AXC recognizes the pixel coordinate (hxv) of the currently input pixel value PV based on the pixel clock signal CKp, the horizontal synchronizing signal HSYNC, and the vertical synchronizing signal VSYNC, and calculates to which block coordinate the pixel coordinate belongs among the blocks having an "X×Y" space. The block coordinate is a coordinate in which the pixel coordinate (hxv) is compressed into "X×Y". A case is assumed herein, for example, of compressing a "640× 480" pixel coordinate into an "8×8" block coordinate. In this case, a horizontal coordinate of the pixel coordinate is divided into "80 (=640/8)"-part segments and a vertical coordinate into "60 (=480/8)"-part segments, and the resulting "80×60" space belongs to a single block.

The block coordinate calculation circuit AXC specifically includes a horizontal coordinate calculation circuit XXC and a vertical coordinate calculation circuit YXC. As seen from FIG. 18, the horizontal coordinate calculation circuit XXC recognizes the horizontal coordinate (h) in the pixel coordinate (hxv) based on the horizontal synchronizing signal HSYNC and the number of counts of the later pixel clock signals CKp, and calculates an "X" coordinate ("A" to "H") by, for example, shifting the horizontal coordinate (h) by three bits (1/8) toward the lower side. As seen from FIG. 18, vertical coordinate calculation circuit YXC recognizes the vertical coordinate (v) in the pixel coordinate (hxv) based on the vertical synchronizing signal VSYNC and the number of counts of the later horizontal synchronizing signals HSYNC, and calculates a "Y" coordinate ("1" to "8") by, for example, shifting the vertical coordinate (v) by three bits toward the lower side.

The pixel value integration circuit PVI generates information for determining the important area IAR, and includes two counter circuits CUNT0, CUNT1 and a plane switching circuit PSW. The plane switching circuit PSW activates the counter circuits CUNT0, CUNT1 alternately by count enable signals CEN0, CEN1 every time the frame is switched by the vertical synchronizing signal VSYNC. Each of the counter circuits CUNT0, CUNT1 includes "8("A" to "H")×8("1" to "8")" pieces of internal counters, and integrates an input pixel value PV with a selected internal counter. Selection of the internal counter is performed by the count enable signals CEN0, CEN1, and the "X" coordinate and the "Y" coordinate from the block coordinate calculation circuit AXC.

For example, a case is assumed in which the counter circuit CUNT0 is selected according to the count enable signal CEN0 when switching the frame. During each period in which each pixel value PV of the pixel coordinate ([h,v]) [1 to 80, 1 to 60] in the corresponding frame is input, the "X" coordinate is "A" and the "Y" coordinate is "1". As a result, the internal counter corresponding to [A,1] in the counter circuit CUNT0 integrates each value PV input during the period. During each period in which each pixel value PV of the pixel coordinate [81 to 160, 1 to 60] is input, the "X" coordinate is "B" and the "Y" coordinate is "1". As a result, the internal counter corresponding to [B,1] in the counter circuit CUNT0 integrates the pixel value PV input during the period.

When the integration processing is performed for one frame by the counter circuit CUNT0 and then proceeds to the next frame, the counter circuit CUNT1 is selected according to the count enable signal CEN1. The counter circuit CUNT1 performs the integration processing on the next frame in the same manner as the counter circuit CUNT0. When the process moves to the next frame, the counter circuit CUNT0 is selected again.

The important area distinction circuit IAJG_A calculates a differential value between the counter circuit CUNT0 and the counter circuit CUNT1 with respect to each "8×8" pieces of internal counters according to the vertical synchronizing signal VSYNC (i.e. when the frame is switched). The important area distinction circuit IAJG_A determines whether each one of the "8×8" blocks is the important area IAR or the unimportant area NAR by comparing the differential value with a predetermined threshold value Cth.

For example, when the values of [A,1] in the internal counters in the counter circuits CUNT0, CUNT1 are respectively C0[A,1] and C1[A,1], the important area distinction circuit IAJG_A calculates C0[A,1]−C1[A,1]. The important area distinction circuit IAJG_A determines the corresponding block [A,1] as the important area IAR when the result of the above-mentioned calculation is equal to or more than the threshold value Cth, and determines the corresponding block [A,1] as the unimportant area NAR when the result is less than the threshold value Cth. The important area distinction circuit IAJG_A performs the same processing on the remaining 63 blocks, and outputs "1" (important area IAR) or "0" (unimportant area NAR) for each one of the 64 blocks.

The distinction information output circuit JIO includes a 64-bit register REGjg corresponding to the 64 blocks [A to H,1 to 8]. Each bit of the register REGjg contains an output ("1" (important area IAR) or "0" (unimportant area NAR)) from each one of the 64 blocks from the important area distinction circuit IAJG_A. For example, an output of the block [A,1] from the important area distinction circuit IAJG_A is stored in the bit [A,1] of the register REGjg.

The distinction information output circuit JIO receives the "X" coordinate and the "Y" coordinate from the block coordinate calculation circuit AXC, and outputs the value contained in the corresponding bit of the register REGjg as distinction information JI. For example, in a case where the "X" coordinate is "A" (horizontal coordinate (h) is 1 to 80) and the "Y" coordinate is "1" (vertical coordinate (v) is 1 to 60), the distinction information output circuit JIO outputs the value of the bit [A,1] of the register REGjg as the distinction information JI. As a result, the distinction information JI indicates whether the pixel coordinate of the currently input pixel value PV belongs to the important area IAR or the unimportant area NAR.

More precisely, because a delay occurs during the processing by the pixel value integration circuit PVI and the distinction information output circuit JIO, a time difference should be caused in the frame to be processed. For example, the important area IAR and the unimportant area NAR are distinguished from each other based on the frame two frames before and the first frame, and the result of the distinction is output as the distinction information JI of the current frame. When the frame rate is sufficiently high, such a time difference usually does not cause any problem. However, if the time difference is regarded as a problem, the time difference can be eliminated by delaying the current frame (for example, delaying the pixel value PV input in FIG. 9 by a few frames).

The blanking period information generation circuit ZIG generates the blanking period information ZI with respect to each "Y" coordinate based on the information of the register REGjg in the distinction information output circuit JI, stores it in a register REGbk, and outputs it according to the "Y" coordinate from the block coordinate calculation circuit AXC. Specifically, the blanking period information generation circuit ZIG outputs the blanking period information ZI including the coordinate information (pixel coordinate) of the important area IAR during the horizontal blanking period TBh located at the top of the horizontal coordinate (h) at which the important area IAR is located, as shown in FIG. 6.

The blanking period information ZI shown in FIG. 6 includes, for example, a start code (herein, "A"+"D"), the number of the important areas IAR included in a target vertical coordinate (line), a start point (horizontal coordinate) and a data width from the start point with respect to each of the important areas, and an error detection code (for example, CRC (Cyclic Redundancy Check) code). In the example shown in FIG. 6, two important areas IAR are included in the line (v). One of the important areas IAR has the horizontal coordinate (h1) as the start point and the data width (w1), and the other has the horizontal coordinate (h2) as the start point and the data width (w2).

Moreover, as shown in FIG. 5, a case is assumed in which "01101110" is stored in the row of "Y"=3 in the register REGjg. The pixel coordinate (h×v) is "640×480". In this case, the blanking period information generation circuit ZIG stores in a location corresponding to "Y"=3 of the register REGbk the start code ("A"+"D"), the number of important areas "2", the start point "81" and the data width "160" of the one, and the start point "321" and the data width "240" of the other. The blanking period information generation circuit ZIG outputs the information contained in the row of "Y"=3 in the register REGjg as the blanking period information ZI when the input "Y" coordinate is "3" (i.e. when the pixel coordinate (v) in the vertical direction is "121 to 180"). The same applies to other "Y" coordinates (1, 2, 4 to 8).

Such a configuration and an operation make is possible to extract, for example, the block BK[2,1] and the block BK[3,2] shown in FIG. 4A as the important areas IAR. Moreover, in the important area distinction circuit IAJG_A, it is also possible to extract the block BK[2,2] by providing a plurality of threshold values Cth, for example, and to extract the important area IAR' by performing an additional processing of bringing the extracted blocks into a larger block.

Figure 7:
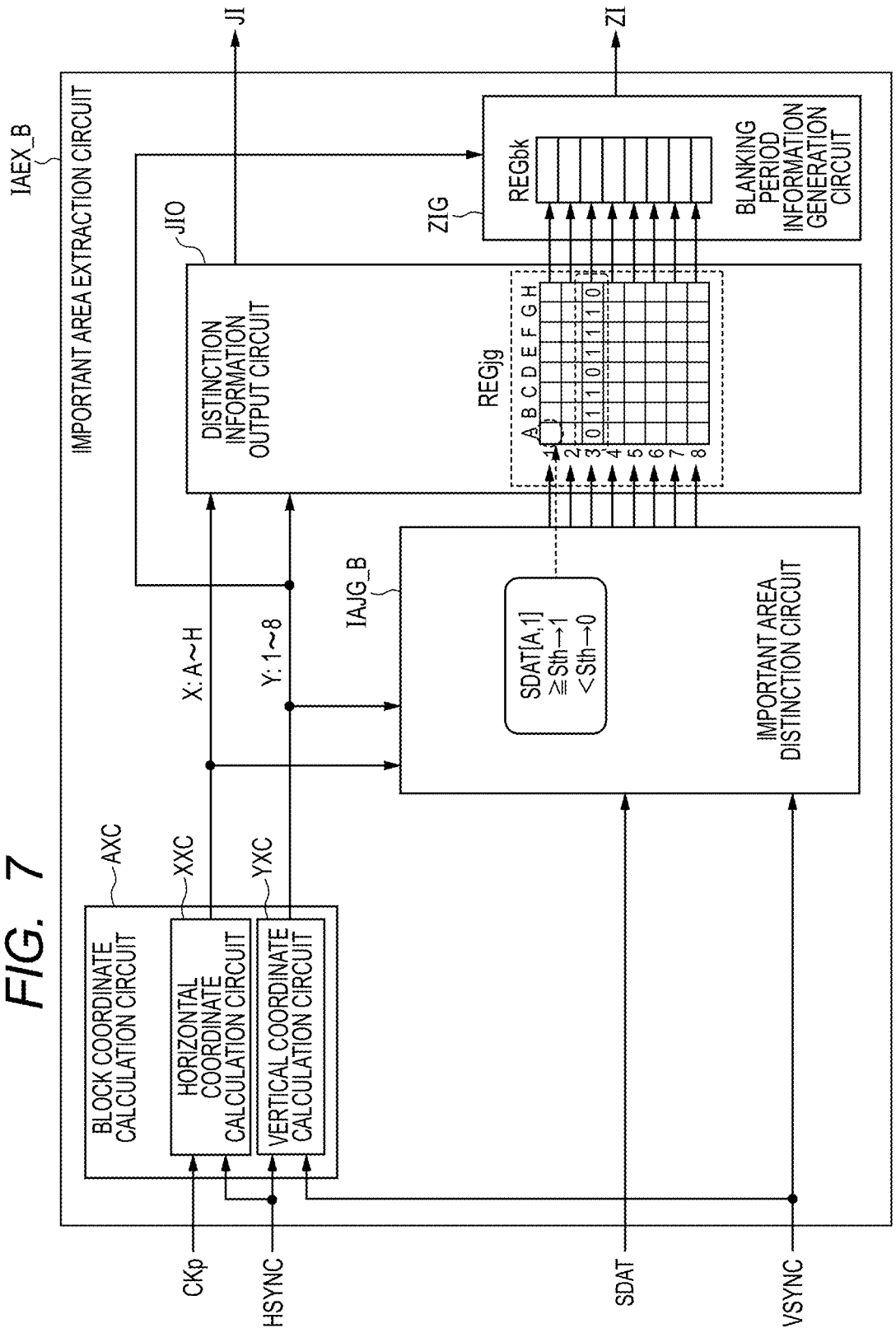
FIG. 7 is a block diagram showing an exemplary configuration of the important area extraction circuit in FIG. 3.

FIG. 7 is a block diagram showing an exemplary configuration of the important area extraction circuit in FIG. 3. The important area extraction circuit IAEX_B shown in FIG. 7 is different from the exemplary configuration shown in FIG. 5 in that the pixel value integration circuit PVI is eliminated and in the configuration and the operation of the important area distinction circuit IAJG_B. The important area extraction circuit IAEX_B extracts the important area IAR based on the sensor data SDAT from the sensor SEN as in the case of FIG. 4B described above.

The important area distinction circuit IAJG_B receives the "X" coordinate and the "Y" coordinate from the block coordinate calculation circuit AXC and obtains the sensor data SDAT corresponding to the coordinates. For example, in the case of "X"=A and "Y"=1, the important area distinction circuit IAJG_B obtains the sensor data SDAT [A,1]. The important area distinction circuit IAJG_B determines the corresponding block [A,1] as the important area IAR when the sensor data SDAT [A,1] is equal to or more than the threshold value Sth, and determines the corresponding block [A,1] as the unimportant area NAR when the sensor data SDAT [A,1] is less than the threshold value Sth. The important area distinction circuit IAJG_B stores the determination result in the register REGjg of the distinction information output circuit JIO as in the case shown in FIG. 5. The same applies to the remaining 63 blocks.

In the method described with reference to FIG. 7, because the important area IAR can be extracted without using the pixel value PV unlike the method shown in FIG. 5, it is possible to reduce the time difference of the frames as described with reference to FIG. 5. Although the important area IAR and the unimportant area NAR are distinguished herein based on the threshold value Sth, the criterion for this determination can be varied depending on the type of the sensor SEN. Moreover, as long as the input sensor data SDAT includes block information, the important area distinction circuit IAJG_B can update the register REGjg by processing in parallel with and independent of the processing of the pixel value without receiving the coordinate from the block coordinate calculation circuit AXC.

[Details of Additional Information Generation Circuit and Data Synthesis Circuit]

Figure 8:
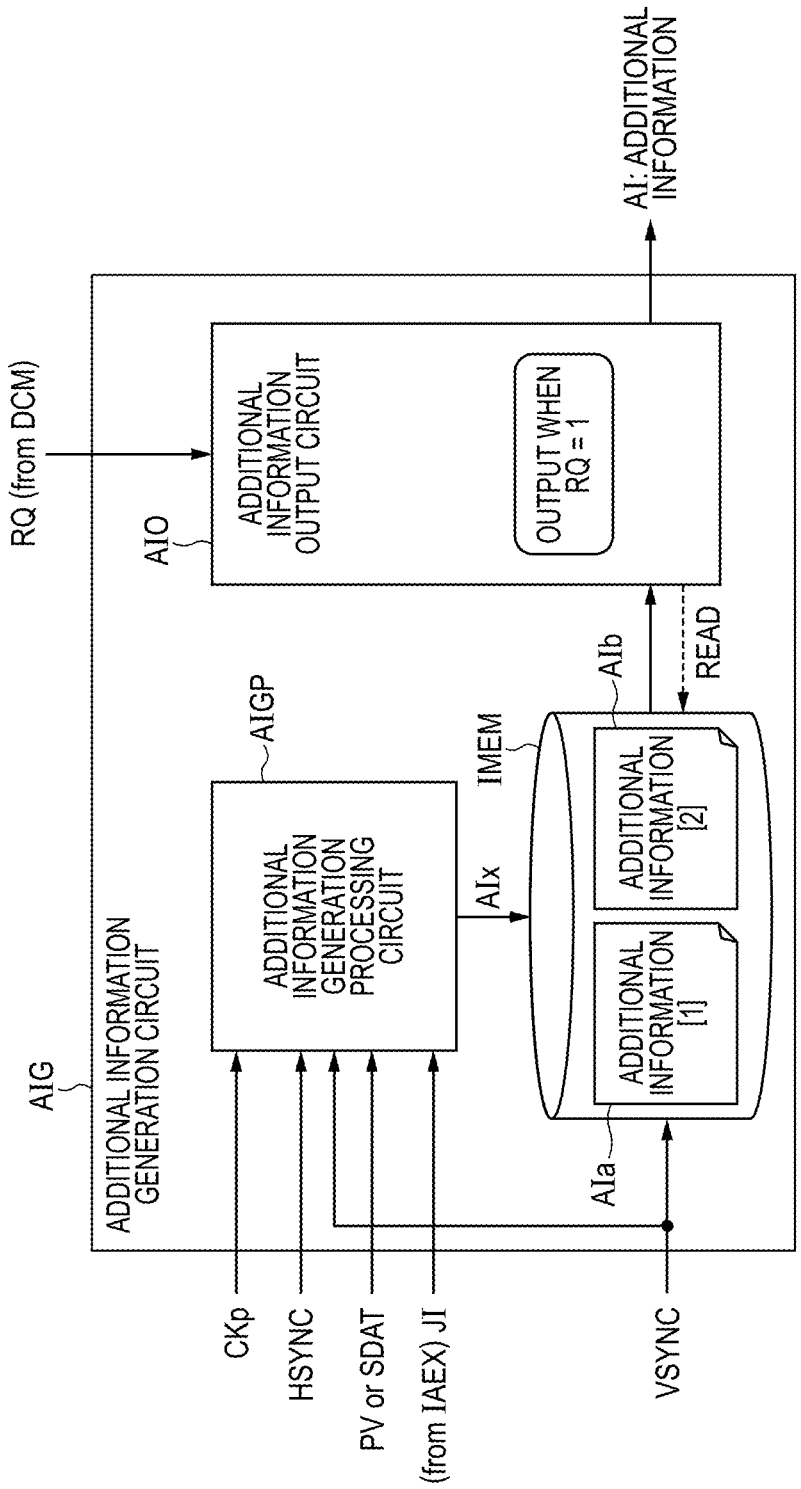
FIG. 8 is a block diagram showing an exemplary configuration of an additional information generation circuit in FIGS. 1 and 3.
Figure 9:
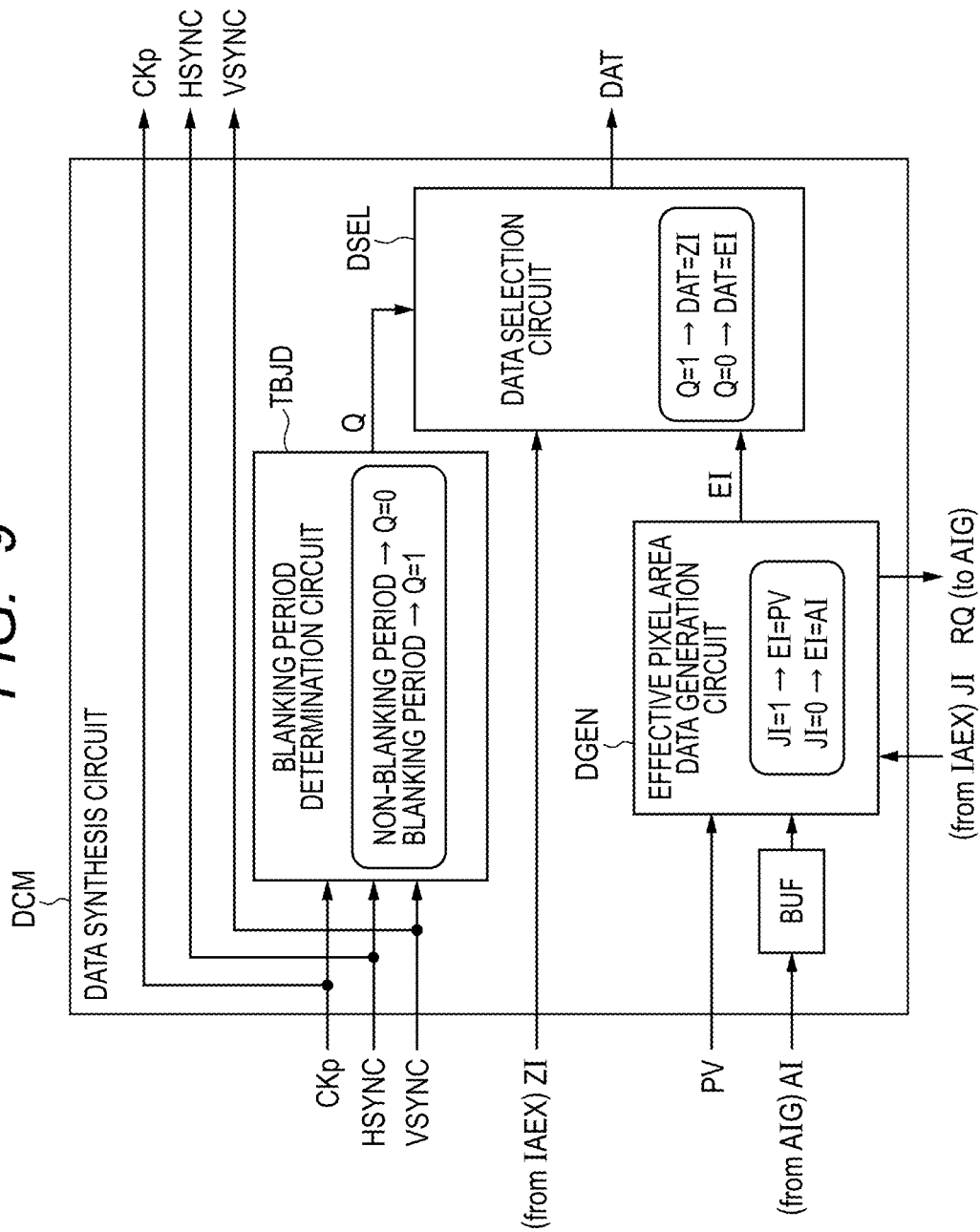
FIG. 9 is a block diagram showing an exemplary configuration of a data synthesis circuit in FIGS. 1 and 3.
Figure 10:
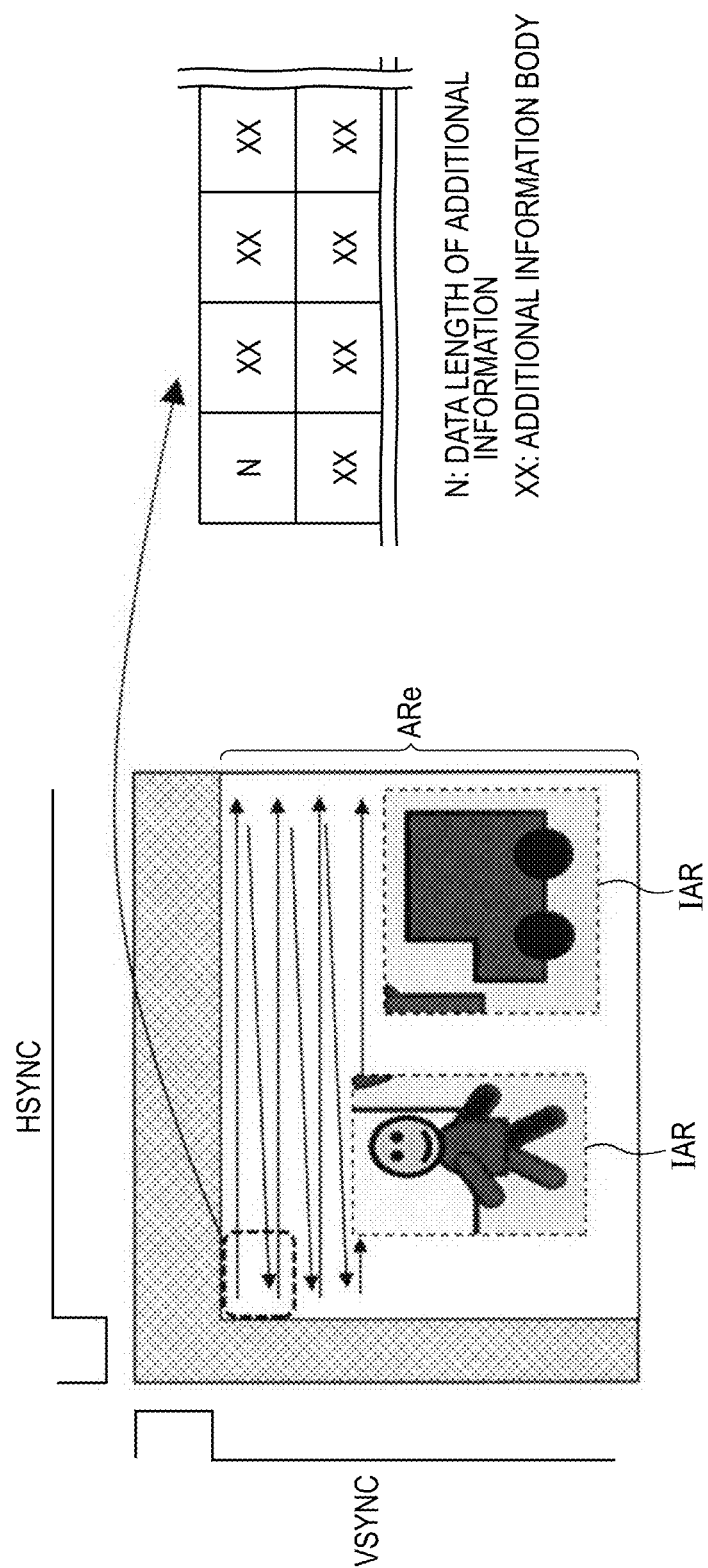
FIG. 10 is a schematic view showing an exemplary operation of the additional information generation circuit in FIG. 8 and the data synthesis circuit in FIG. 9.

FIG. 8 is a block diagram showing an exemplary configuration of the additional information generation circuit in FIGS. 1 and 3. FIG. 9 is a block diagram showing an exemplary configuration of the data synthesis circuit in FIGS. 1 and 3. FIG. 10 is a schematic view showing an exemplary operation of the additional information generation circuit in FIG. 8 and the data synthesis circuit in FIG. 9. The additional information generation circuit AIG shown in FIG. 8 includes an additional information generation processing circuit AIGP, an internal memory IMEM, and an additional information output circuit AIO.

The internal memory IMEM may be, for example, a two-side ring buffer capable of containing additional information [1]AIa, [2]AIb for two frames. The additional information generation processing circuit AIGP receives, for example, the vertical synchronizing signal VSYNC and the pixel value PV or the sensor data SDAT, generates additional information AIx with respect to each frame, and stores the generated additional information AIx in one side of the internal memory IMEM by switching the side for storing for every frame.

The additional information AIx is, as described above, some kind of information according to the user application or the like including, for example, various information useful for the application such as marketing and crime prevention. One specific examples may be a rough analysis result of the important area IAR (what kind of moving body (human or object) is present in the important area, how may moving bodies are present, and the like). In this case, the additional information generation circuit AIG recognizes the raw data of the target frame in response to the pixel clock signal CKp and the horizontal synchronizing signal HSYNC in addition to the pixel value PV and the vertical synchronizing signal VSYNC. Furthermore, the additional information generation circuit AIG recognizes the raw data of the important area IAR in response to the distinction information JI from the important area extraction circuit IAEX shown in FIGS. 5 and 7, and performs image analysis on the raw data.

Generating such additional information AIx and embedding it in the unimportant area NAR as shown in FIG. 2 make it possible to reduce the processing load of a post-stage processing unit including the image signal processor ISP (for example, SSPD shown in FIG. 1 and even later stage). The post-stage processing unit normally needs to analyze a large amount of data of the whole image to obtain desired information, but using such an additional information AIx allows for detailed analysis on a partial area (important area IAR) of the whole image as the analysis is completed to some degree. That is, the additional information generation circuit AIG operates to cover a part of the processing that should be originally performed by the post-stage processing unit.

Other specific examples of the additional information AIx include the sensor data SDT itself, the analysis result of the sensor data SDT related to the important area IAR, and the like. In this case, the additional information generation circuit AIG receives the sensor data SDAT and the vertical synchronizing signal VSYN as well as the distinction information JI from the important area extraction circuit IAEX shown in FIGS. 5 and 7, and generates the additional information AIx. The post-stage processing unit normally needs to obtain the raw data including the pixel value PV and the sensor data SDT independently and associate the raw data with the sensor data SDT as needed (for example, synchronization of image and sound). By using such additional information AIx, the post-stage processing unit can obtain the associated data.

Furthermore, the additional information AIx may be information required for device control (for example, setting and control of the image sensor and the image signal processor). For example, in such a system as shown in FIG. 1, the image signal processor ISP can perform appropriate exposure control on the image sensor CSEN_A (setting of the image sensor CSEN_A) by obtaining information about exposure of the image sensor CSEN_A as the additional information AIx.

In general, the image signal processor ISP actively obtains such exposure information from the image sensor CSEN_A via a leased line (a serial line such as I2C that couples the image sensor CSEN_A to the post-stage processing device SSPD). Using the additional information AIx as the information required for the device control can eliminate such a communication processing using the leased line, making it possible to transfer the pre-stage information obtained in the frame (such information as required for controlling the image sensor) to the post-stage along with the image of the frame.

The additional information output circuit AIO receives a request signal RQ from the data synthesis circuit DCM shown in FIG. 9, reads out information from the other side of the internal memory IMEM, and outputs the read-out information as the additional information AI. For example, in a case where the additional information generation processing circuit AIGP generates the additional information [1]AIa for the current frame, the additional information output circuit AIO reads out the additional information [2]AIb generated for a previous frame.

The data synthesis circuit DCM shown in FIG. 9 includes a blanking period determination circuit TBJD, a buffer BUF, an effective pixel area data generation circuit DGEN, and a data selection circuit DSEL. The blanking period determination circuit TBJD receives the pixel clock signal CKp, the horizontal synchronizing signal HSYNC, and the vertical synchronizing signal VSYNC, and determines the blanking period (specifically, the horizontal blanking period TBh shown in FIG. 6). The blanking period determination circuit TBJD controls an output signal Q to "1" during a blanking period, and controls the output signal Q to "0" during a non-blanking period.

The buffer BUF temporarily stores therein the additional information AI from the additional information generation circuit AIG shown in FIG. 8. The effective pixel area data generation circuit DGEN receives the distinction information JI from the important area extraction circuit IAEX shown in FIGS. 5 and 7, selects the pixel value PV when the distinction information JI is "1" (important area IAR) and selects the additional information AI from the buffer BUF when it is "0" (unimportant area NAR). The effective pixel area data generation circuit DGEN outputs the selected one as an output signal EI. Moreover, the effective pixel area data generation circuit DGEN sequentially issues the request signal RQ to the additional information generation circuit AIG when the distinction information JI is "0". Accordingly, the additional information generation circuit AIG outputs the additional information AI as described above.

The data selection circuit DSEL receives the output signal Q of the blanking period determination circuit TBJD, selects the blanking period information ZI from the important area extraction circuit IAEX shown in FIGS. 5 and 7 during a period in which Q=1 (blanking period), and selects the output signal EI of the effective pixel area data generation circuit DGEN during a period in which Q=0 (non-blanking period). The data selection circuit DSEL outputs the selected one as the data DAT. As a result, the data selection circuit DSEL outputs the raw data of the important area IAR (pixel value PV) as the data DAT during the period corresponding to the important area IAR in the transmission period of the frame, and outputs the additional information AI as the data DAT during the period corresponding to the unimportant area NAR.

The additional information AI with respect to each frame is included by, for example, the data length N of the additional information AI and the additional information body that follows, as shown in FIG. 10. The additional information generation processing circuit AIGP shown in FIG. 8 generates the additional information (such as AIa) with respect to each frame, and stores the generated additional information with the data length N added thereto in the corresponding side of the internal memory IMEM. The additional information output circuit AIO shown in FIG. 8 outputs the additional information (AIa) sequentially from the top according to the request signal RQ (i.e. when the distinction information JI is "0" (unimportant area NAR)). As a result, the data synthesis circuit DCM shown in FIG. 9 outputs the data length N as the data DAT during a period in which the unimportant area NAR emerges first after the frame is switched.

As shown in FIG. 10, in a case where the top of the effective pixel area ARe is not the important area IAR, the data length N is to be stored at the top of the effective pixel area ARe. If the top of the effective pixel area ARe is the important area IAR, the data length N is to be stored at the horizontal coordinate at which the important area IAR terminates. Moreover, the additional information AI is to be sequentially output skipping the important area IAR.

[Major Effect of First Embodiment]

As described above, using the method of the first embodiment makes it possible to extract the important area IAR with respect to each frame and transmit it to the post-stage processing unit such as the image signal processor ISP. It is also possible to embed the additional information AI in the remaining area as the important area IAR is extracted, and transmit it to the post-stage processing unit. As a result, the first effect is that the amount of information can be reduced without degrading the useful information. As the second effect, it is possible to reduce the resources of the post-stage processing unit. As the third effect, it is possible to increase the value (or density) of the useful information compared with the prior art.

Specifically, in the post-stage processing unit, because the target of the image processing can be limited to the important area IAR, with reduction of the amount of data to be processed and stored, it is possible to reduce the size of the memory MEM and various processing circuits and reduce the processing load and communication load of the processing circuits. In this process, the useful information (i.e. the raw data of the important area IAR) is retained as it is, which does not cause quality degradation in proportion to the reduced amount of information as can be observed in the cases of Japanese Unexamined Patent Application Publication No. 2000-278349 and Japanese Unexamined Patent Application Publication No. 2001-333267.

Moreover, when the post-stage processing unit has a constant amount of resources, it is possible to further increase the value (or density) of the useful information with free resources by deleting useless information (i.e. the raw data of the unimportant area NAR). For example, in a comparison example as shown in FIG. 17A, resolution improvement of the pixel array PXARY can drastically increase the amount of information, and therefore the resolution improvement is restricted to the resources of the post-stage processing unit. On the other hand, because only the useful information is extracted even when the resolution improvement is performed, the method of the first embodiment suppresses the increase of the amount of information, making extra resources of the post-stage processing unit available. As a result, it is possible to obtain the useful information with even higher quality using the extra resources.

Furthermore, using the additional information AI also makes it possible to reduce the resources of the post-stage processing unit and increase the value (or density) of the useful information. For example, by having the additional information generation circuit AIG perform a part of the processing conventionally performed by the post-stage processing unit and using the processing result as the additional information AI, it is possible to reduce the resources of the post-stage processing unit. Moreover, by using various information related to the important area IAR (for example, image analysis result of the important area, sensor data corresponding to the important area, and analysis result of the sensor data) as the additional information AI, the value of the information can be increased compared with the case of simply receiving the raw data of the important area IAR.

Second Embodiment
[Application Example [1] of Security Camera System]

FIGS. 11A and 11B are diagrammatic views showing examples applied to an actual application in a security camera system according to a second embodiment of the invention. FIG. 11A shows an exemplary configuration in which an auxiliary camera such as an infrared camera is used as the sensor SEN in the security camera system SSYS_B shown in FIG. 3. The security camera system SSYS_B and the auxiliary camera are arranged to image the same area. In this case, the security camera system SSYS_B can extract the important area IAR based on information from the auxiliary camera.

FIG. 11B shows an exemplary configuration in which one of various sensing devices including a human sensor, a microphone, and a beacon and a receiver is used as the sensor SEN in the security camera system SSYS_B shown in FIG. 3. For example, when receiving a sensing signal from one of a plurality of sensors SEN arranged at a predetermined interval in a large area while imaging the area, the security camera system SSYS_B extracts an area based on the arrangement of the sensor SEN as the important area IAR. Afterwards, the security camera system SSYS_B can zoom in the important area IAR for imaging it, for example.

Figure 12:
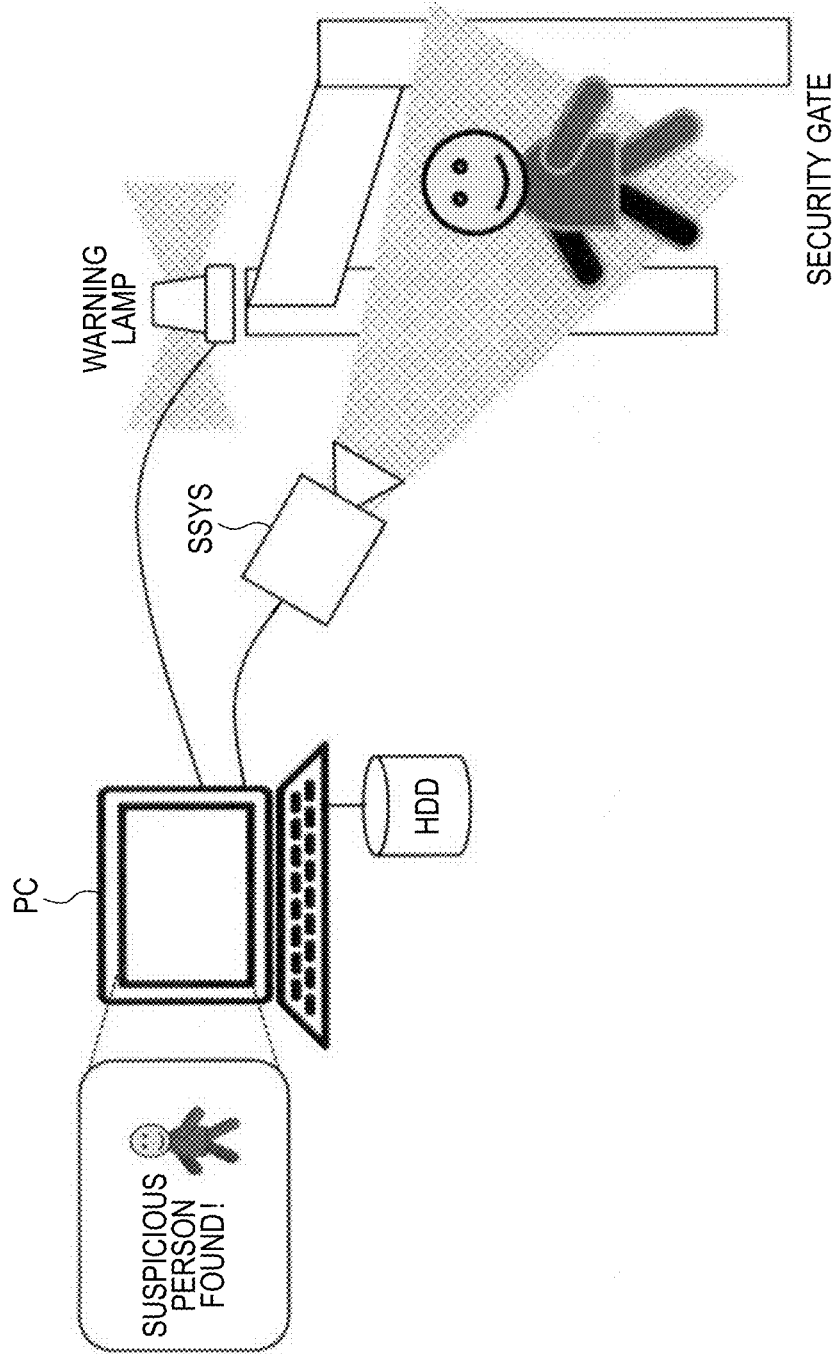
FIG. 12 is a diagrammatic view showing another example applied to an actual application in the security camera system according to the second embodiment of the invention.

FIG. 12 is a diagrammatic view showing another example applied to an actual application in the security camera system according to the second embodiment of the invention. FIG. 12 shows an exemplary configuration in which the security camera system SSYS shown in FIG. 1 or 3 is applied to a security gate that senses passage and recognizes a passer. A cardless operation is expected for the security gate instead of using a physical card. Using the security camera system SSYS according to the embodiment for such an application provides various effects as described below.

The security camera system SSYS images the security gate, and a PC (Personal Computer) determines permission or rejection of passage through the gate by performing image authentication (such as face authentication) using the data output from the security camera system SSY. For defection of passage, the PC turns on a warning lamp or the like. Taking an example of the security camera system SSYS_A shown in FIG. 1, when there is no passer at the gate, the image sensor CSEN_A operates but there is no data to be processed by the post-stage processing device SSPD (and thus the PC) because there is no change in the pixel value. Consequently, the power consumption of the post-stage processing unit can be reduced.

On the other hand, when there is a passer at the gate, the security camera system SSYS_A extracts the area having a large change of the pixel value (i.e. an area where the passer is present) as the important area IAR, and transmits the image data to the PC. The PC has only to perform the face authentication on and store the image data of the important area IAR, which can reduce various resources. In other words, when using such a security camera system as shown in FIG. 17A, the PC needs to receive the data of the whole image constantly, perform the image processing on the received data, and store the whole image in an HDD (Hard Disk Drive) or the like. Using the security camera system SSYS_A can eliminate such a waste of communication, operation, and recording resources. Moreover, because the PC can receive the image data already limited to the target, it is possible to reduce time required for the image processing, thereby achieving more real-time monitoring.

Third Embodiment
[Application Example [2] of Security Camera System]

Figure 13:
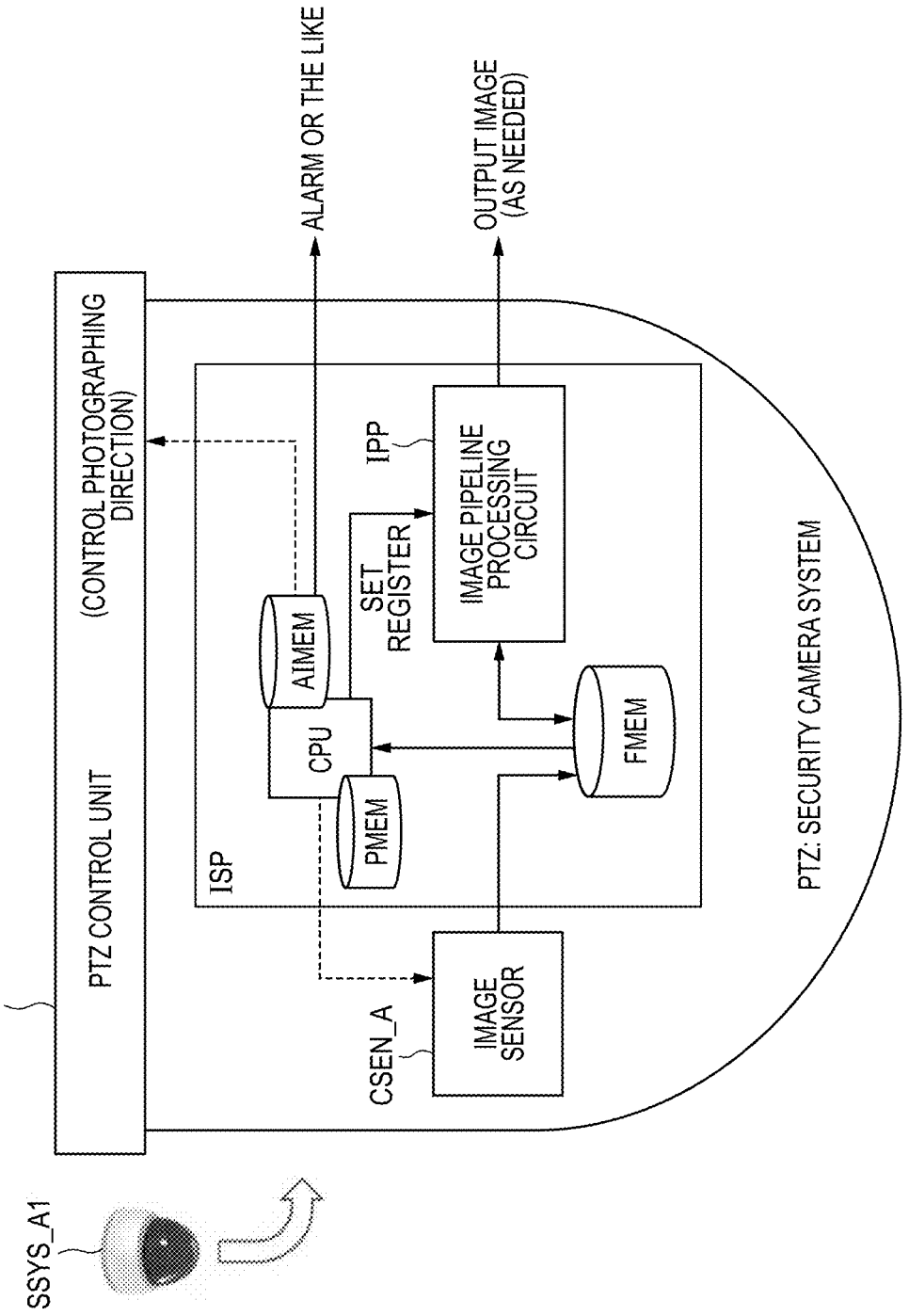
FIG. 13 is a diagrammatic view showing an example applied to an actual application in a security camera system according to a third embodiment of the invention.

FIG. 13 is a diagrammatic view showing an example applied to an actual application in a security camera system according to a third embodiment of the invention. FIG. 13 shows, for example, an exemplary configuration in which the security camera system SSYS_A shown in FIG. 1 is applied to a security camera system SSYS_A1 of the pan-tilt-zoom (PTZ) type. The security camera system SSYS_A1 includes the image sensor CSEN_A, the image signal processor ISP, and a PTZ control unit CT.

The image signal processor ISP includes a CPU, a frame memory FMEM, a program memory PMEM, a memory for additional information AIMEM, and an image pipeline processing circuit IPP. The image signal processor ISP temporarily stores the raw data from the image sensor CSEN_A in the frame memory FMEM. The frame memory FMEM stores therein the raw data of the important area IAR, the additional information AI, and the blanking period information ZI in a mingled state.

The image pipeline processing circuit IPP performs image processing such as correction on the raw data, and possibly conversion of the raw data into another image format such as JPEG, using hardware. The CPU performs control on the image pipeline processing circuit IPP, the image sensor CSEN_A, and the like based on a program stored in the program memory PMEM. In this example, the CPU recognizes an address of the important area IAR by reading the blanking period information ZI from a predetermined address area of the frame memory FMEM, and sets the recognized address area in a predetermined register of the image pipeline processing circuit IPP. In response to this, the image pipeline processing circuit IPP reads out the raw data of the important area IAR from the frame memory FMEM, and performs the image processing on the raw data of the important area IAR. At this time, the image pipeline processing circuit IPP does not have to perform the image processing on the raw data of the whole frame, which allows for reduction of processing load.

Moreover, the CPU stores the data readout from the address area except for the address area of the blanking period information ZI and the address area of the important area IAR in the frame memory FMEM in the memory for additional information AIMEM as the additional information AI. At the same time, as shown in FIG. 10, the CPU first reads the data length N of the additional information AI, and reads out the data for the data length as the additional information AI while skipping the address area to be excluded. In this example, the CPU issues an alarm, and issues a control command to the PTZ control unit CT as for an imaging direction (left/right, up/down, and zoom), based on the additional information AI.

Figure 14:
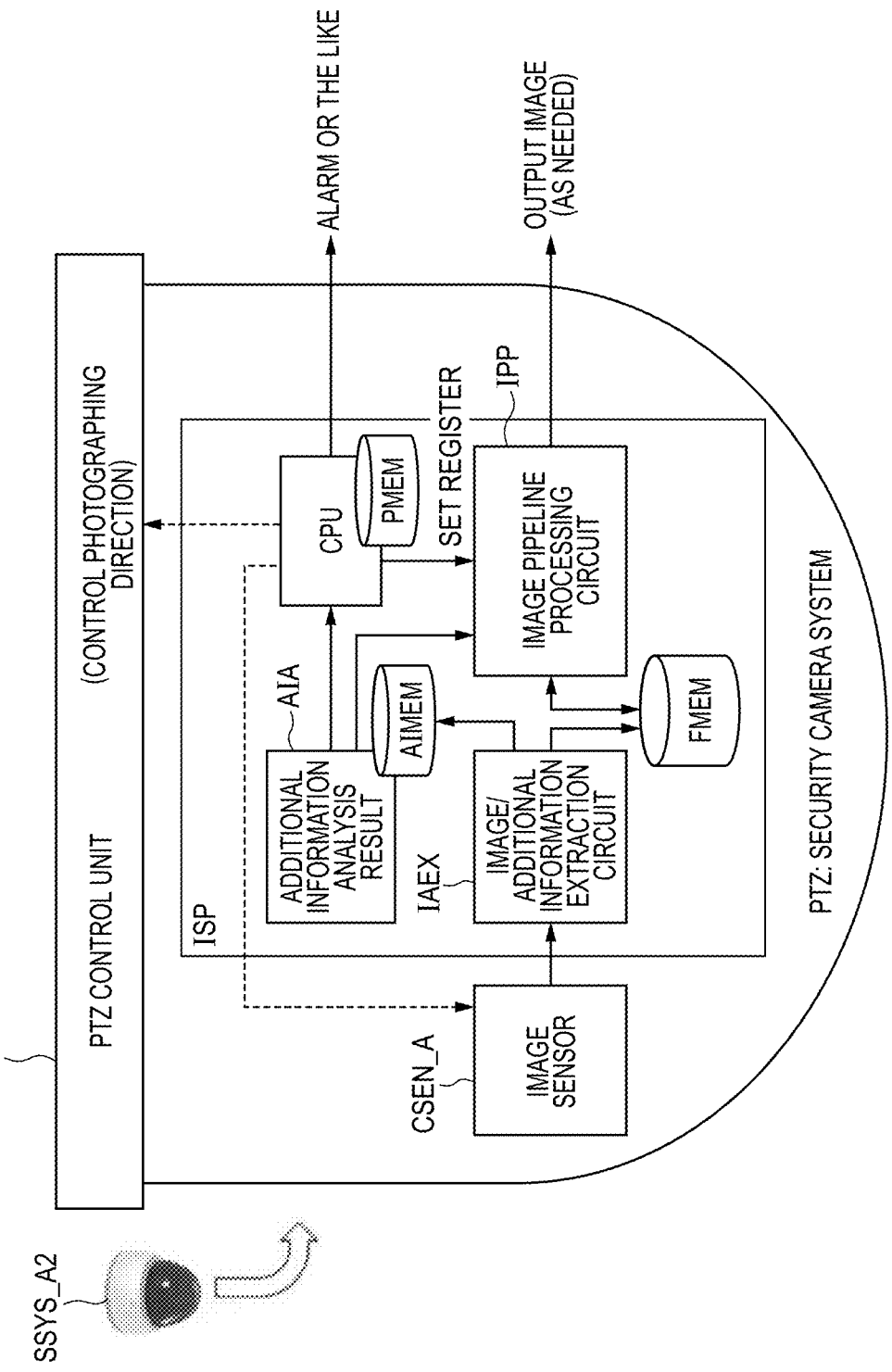
FIG. 14 is a diagrammatic view showing an application example modified from the example shown in FIG. 13.

FIG. 14 is a diagrammatic view showing an application example modified from the example shown in FIG. 13. FIG. 14 shows, for example, an exemplary configuration in which the security camera system SSYS_A shown in FIG. 1 is applied to a security camera system SSYS_A2 of the PTZ type as in the case shown in FIG. 13. However, it is different from FIG. 13 in the configuration of the image signal processor ISP. The image signal processor ISP shown in FIG. 14 includes an image/additional information extraction circuit IAEX, an additional information analysis circuit AIA, the CPU, the image pipeline processing circuit IPP, the frame memory FMEM, the program memory PMEM, and the memory for additional information AIMEM.

The image/additional information extraction circuit IAEX receives the raw data from the image sensor CSEN_A and recognizes the coordinate information of the important area IAR based on the blanking period information ZI of the blanking period, thereby obtaining the raw data of the important area IAR and the additional information AI separately. The image/additional information extraction circuit IAEX stores the obtained raw data of the important area IAR in the frame memory FMEM, and the obtained additional information AI in the memory for additional information AIMEM.

It is noted that the image/additional information extraction circuit IAEX can obtain the coordinate information of the important area IAR before receiving the raw data of the important area IAR as shown in FIG. 6 and obtain the data length N of the additional information AI at the start of data reception as shown in FIG. 10. Accordingly, the image/additional information extraction circuit IAEX can obtain the raw data of the important area IAR and the additional information AI separately in real time while receiving the raw data from the image sensor CSEN A.

The additional information analysis circuit AIA performs knee-jerk processing such as performing predetermined processing when specific information is included in the additional information AI. For example, to change the processing of the image pipeline processing circuit IPP based on the image pipeline processing circuit IPP, the additional information analysis circuit AIA performs various types of register setting on the image pipeline processing circuit IPP. Although such processing may be performed by the CPU, the additional information analysis circuit AIA performs it in this example to control the image pipeline processing circuit IPP more quickly. Other circuits are the same as those in FIG. 13.

A general configuration is assumed for the image signal processor ISP shown in FIG. 13. Even when the general configuration is employed as described above, the method of this embodiment can be applied. On the other hand, the image signal processor ISP shown in FIG. 14 is configured to include dedicated hardware such as the image/additional information extraction circuit IAEX (and additional information analysis circuit AIA). By including the dedicated hardware, for example, it is possible to store only the raw data of the important area IAR in the frame memory FMEM, thereby reducing the resources of the frame memory FMEM. Moreover, it is also possible to increase the processing speed because it is possible to performs some processing without interposing the CPU.

Fourth Embodiment
[Outline of Security Camera System (Application Example)]

FIG. 15 is a diagrammatic view showing an exemplary configuration and an exemplary operation of a main part of a security camera system according to a fourth embodiment of the invention. FIG. 16 is a diagrammatic view showing an exemplary configuration and an exemplary operation of a main part different from what is shown in FIG. 15. The method according to the first embodiment described above can be applied to various mounting configurations. For example, the security camera system shown in FIG. 15 includes a transmitter TX and a receiver RX.

The transmitter TX includes the image sensor CSEN similar to that shown in FIG. 17A, an image processing device IPD, and the sensor SEN. The image processing device IPD includes, for example, substantially the same configuration as the pre-stage processing device FSPD and the post-stage processing device SSPD in the security camera system SSYS_B shown in FIG. 3. Unlike the example shown in FIG. 3, however, the data synthesis circuit DCM outputs only the raw data of the important area IAR without combining data, and the additional information generation circuit AIG outputs the additional information AI independently without interposing the data synthesis circuit DCM.

The image processing device IPD transmits the image data of the important area IAR and the additional information AI separately to the receiver RX. Because the data received by the receiver RX at this time has been processed by the image signal processor ISP, it does not have to be in such a format as shown in FIG. 18 but may be a general format such as for serial communication, for example. Accordingly, the image processing device IPD transmits the image data with an identifier indicative of its start and end added thereto, and similarly transmits the additional information AI with another identifier indicative of its start and end added thereto.

The receiver RX includes an image/additional information separation circuit IADV, an image display circuit DPC, an error determination circuit ERC, the frame memory FMEM, and the memory for additional information AIMEM. The image/additional information separation circuit IADV separates the image data of the important area IAR and the additional information AI based on, for example, the above-mentioned identifier, stores the image data in the frame memory FMEM, and stores the additional information AI in the memory for additional information AIMEM.

The image display circuit DPC displays the image data of the important area IAR stored in the frame memory FMEM on a display DPY. Alternatively, the image display circuit DPC may obtain the image data of the background as a template in advance, and sequentially superimpose the obtained image data of the important area IAR on the template. In this example, the error determination circuit ERC determines presence of an error based on the additional information AI stored in the memory for additional information AIMEM, and turns on the warning lamp or the like if there is an error.

The data transmitted from the transmitter TX to the receiver RX is generally that of the whole image, but it can be the image data of the important area IAR when using the method shown in FIG. 15. As a result, it is possible to reduce the resources used for communication between the transmitter TX and the receiver RX. Moreover, because the processing by the receiver RX is focused on the image data of the important area IAR, it is also possible to reduce the resources of the receiver RX (processing load and memory capacity).

The security camera system shown in FIG. 16 includes the transmitter TX. The transmitter TX is configured by integrating various circuits into a general camera system CSYS' and the sensor SEN. The various circuits include the important area extraction circuit IAEX, the additional information generation circuit AIG, an output image generation circuit IMG, and a communication circuit CC. The important area extraction circuit IAEX has the same function as those shown in FIGS. 5 and 7.

It should be noted, however, that the processing target of the important area extraction circuit IAEX herein is the image data having been processed by the image signal processor ISP (for example, the image data in the YUV format), unlike the raw data in the cases of FIGS. 5 and 7. Therefore, the blanking period information generation circuit ZIG shown in FIGS. 5 and 7 is not required, and input/output signals of the important area extraction circuit IAEX are also different. Despite such a difference, the important area extraction circuit IAEX has the same general function as those in FIGS. 5 and 7.

Specifically, the important area extraction circuit IAEX distinguishes the blocks to be the important area IAR from the image data using the same method as described with reference to FIGS. 5 and 7. The output image generation circuit IMG extracts the image data of the important area IAR based on the distinction information from the important area extraction circuit IAEX. The additional information generation circuit AIG generates additional information based on the image data of the important area IAR from the output image generation circuit IMG and the sensor data SDAT from the sensor SEN. For example, the additional information generation circuit AIG may perform face recognition and object recognition and use the result as the additional information. The communication circuit transmits the image data of the important area IAR from the output image generation circuit IMG and the additional information from the additional information generation circuit AIG.

A general security camera system continues to output a moving image (image data) using video codec. However, because the security camera system according to the embodiment is not used for just providing image data, it suffices to detect and cut out an area of high importance in case of an event and to output it as a still image (for example, JPEG data). This can reduce the total amount of data communication. Moreover, the communication circuit CC may transmit data in a general format such as for serial communication, as in the case of FIG. 15. Thus, for example, the communication circuit CC can embed the additional information in a user data area in header information of a still image compression format (for example, JPEG).

While the invention made by the inventors is specifically described above with reference to the embodiments, the invention is not limited to the embodiments but may be modified in many ways without departing from its scope. For example, the above-mentioned embodiments are detailed to comprehensively describe the invention and not necessarily limited to include all the configurations described above. A part of a configuration of one embodiment can be replaced by a configuration of another embodiment, and a configuration of one embodiment can be added to a configuration of another embodiment. A part of the configuration of each embodiment can be added to, deleted from, or replaced by another configuration.

What is claimed is:

1. A security camera system comprising:
a pixel array included by a plurality of imaging elements;
an image signal processor that performs various types of image processing on raw data including each pixel value from the pixel array; and
an image processing unit arranged between the pixel array and the image signal processor,
wherein the image processing unit comprises an important area extraction circuit that receives the raw data from the pixel array with respect to each frame and divides an effective pixel area of the frame into an important area and an unimportant area, and transmits the raw data of the important area to the image signal processor;
wherein the image processing unit further comprises a data synthesis circuit that combines predetermined additional information and the raw data from the pixel array and transmits the resulting data to the image signal processor, and
wherein, based on distinction information from the important area extraction circuit, the data synthesis circuit transmits the raw data of the important area to the image signal processor during a period corresponding to the important area in the transmission period of the frame, and transmits the predetermined additional information to the image signal processor instead of the raw data of the unimportant area during a period corresponding to the unimportant area.

2. The security camera system according to claim 1,
wherein the image processing unit further comprises a blanking period information generation circuit that generates coordinate information of the important area as information about a blanking period in the transmission period of the frame,
wherein the data synthesis circuit transmits the coordinate information of the important area from the blanking period information generation circuit to the image signal processor during the blanking period, and
wherein the image signal processor obtains the raw data of the important area and the predetermined additional information separately by recognizing the coordinate information of the important area during the blanking period.

3. The security camera system according to claim 2,
wherein the data synthesis circuit transmits the coordinate information of the important area to the image signal processor during a horizontal blanking period located at the top of the horizontal coordinate at which the important area is located.

4. The security camera system according to claim 1, wherein the image processing unit further comprises an additional information generation circuit that generates the predetermined additional information, and wherein the additional information generation circuit performs predetermined image analysis on the raw data of the important area based on the distinction information from the important area extraction circuit, and generates the analysis result as the predetermined additional information.

5. The security camera system according to claim 1, further comprising:

a predetermined sensor that is provided in the pixel array or separately from the pixel array and outputs sensor data in parallel with the raw data with respect to each frame from the pixel array with respect to each frame, wherein the image processing unit further comprises an additional information generation circuit that receives the sensor data and generates information based on the sensor data as the predetermined additional information.

6. The security camera system according to claim 1, wherein the important area extraction circuit distinguishes between the important area and the unimportant area based on comparison between the each pixel value of the raw data of a previous frame and the each pixel value of the raw data of a current frame.

7. The security camera system according to claim 6, wherein the important area extraction circuit manages the effective pixel area by dividing it into a plurality of blocks, and determines whether the block is the important area or the unimportant area by comparing either an integrated value or an average value of the each pixel value included in each of the blocks between the last time and this time.

8. The security camera system according to claim 1, further comprising:

a predetermined sensor that is provided in the pixel array or separately from the pixel array and outputs sensor data in parallel with the raw data with respect to each frame from the pixel array, wherein the important area extraction circuit distinguishes between the important area and the unimportant area based on the sensor data.

9. The security camera system according to claim 1, wherein the pixel array and the image processing unit are mounted on a single semiconductor chip.

10. A security camera system comprising:

a pixel array included by a plurality of imaging elements;

an image signal processor that performs various types of image processing on raw data including each pixel value from the pixel array; and an image processing unit provided at a later stage of the image signal processor, wherein the image processing unit comprises an important area extraction circuit that receives image data from the image signal processor with respect to each frame, and divides an image area with respect to each frame into an important area and an unimportant area.

11. An image processing apparatus arranged between a pixel array included by a plurality of imaging elements and an image signal processor that performs various types of image processing on raw data including each pixel value from the pixel array, wherein the image processing apparatus comprises an important area extraction circuit that receives the raw data from the pixel array with respect to each frame and divides an effective pixel area of the frame into an important area and an unimportant area and transmits the raw data of the important area to the image signal processor.

12. The image processing apparatus according to claim 11, further comprising:

a data synthesis circuit that combines predetermined additional information and the raw data from the pixel array and transmits the resulting data to the image signal processor, wherein, based on distinction information from the important area extraction circuit, the data synthesis circuit transmits the raw data of the important area to the image signal processor during a period corresponding to the important area in the transmission period of the frame, and transmits the predetermined additional information to the image signal processor instead of the raw data of the unimportant area during a period corresponding to the unimportant area.

13. The image processing apparatus according to claim 12, further comprising:

a blanking period information generation circuit that generates coordinate information of the important area as information about the blanking period in the transmission period of the frame, wherein the data synthesis circuit transmits the coordinate information of the important area from the blanking period information generation circuit to the image signal processor during the blanking period.

14. The image processing apparatus according to claim 13, wherein the data synthesis circuit transmits the coordinate information of the important area to the image signal processor during a horizontal blanking period located at the top of the horizontal coordinate at which the important area is located.

15. The image processing apparatus according to claim 12, further comprising:

an additional information generation circuit that generates the predetermined additional information, wherein the additional information generation circuit performs predetermined image analysis on the raw data of the important area based on the distinction information from the important area extraction circuit, and generates the analysis result as the predetermined additional information.

16. The image processing apparatus according to claim 12, further comprising:

an additional information generation circuit that receives sensor data from a predetermined sensor provided in the pixel array or separately from the pixel array in parallel with the raw data with respect to each frame from the pixel array, and generates information based on the sensor data as the predetermined additional information.

17. The image processing apparatus according to claim 11, wherein the important area extraction circuit distinguishes between the important area and the unimportant area based on comparison between the each pixel value of the raw data of a previous frame and the each pixel value of the raw data of a current frame.

18. The image processing apparatus according to claim 17, wherein the important area extraction circuit manages the effective pixel area by dividing it into a plurality of blocks, and determines whether the block is the important area or the unimportant area by comparing either an integrated value or an average value of the each pixel value included in each of the blocks between the last time and this time.

19. The image processing apparatus according to claim 11, wherein the important area extraction circuit receives sensor data from a predetermined sensor provided in the pixel array or separately from the pixel array in parallel with the raw data with respect to each frame from the pixel array, and distinguishes between the important area and the unimportant area based on the sensor data.

* * * * *